United States Patent
Fleming

(10) Patent No.: US 10,512,857 B2
(45) Date of Patent: Dec. 24, 2019

(54) SYSTEMS AND METHODS FOR VISCOUS MATERIAL VACUUM DEAERATION, AND SYSTEMS AND METHODS FOR DEPOSITING COMPOUNDS IN A STRUCTURE

(71) Applicant: The Boeing Company, Chicago, IL (US)

(72) Inventor: Michael John Fleming, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 405 days.

(21) Appl. No.: 15/356,980

(22) Filed: Nov. 21, 2016

(65) Prior Publication Data

US 2017/0259191 A1    Sep. 14, 2017

Related U.S. Application Data

(63) Continuation-in-part of application No. 15/063,854, filed on Mar. 8, 2016.

(51) Int. Cl.
*B01D 19/00* (2006.01)
*B29C 73/02* (2006.01)
(Continued)

(52) U.S. Cl.
CPC ..... *B01D 19/0047* (2013.01); *B01D 19/0036* (2013.01); *B01D 19/0063* (2013.01);
(Continued)

(58) Field of Classification Search
CPC ............ B01D 19/0047; B01D 19/0036; B01D 19/0063; B64F 5/40; B29C 37/006; B29C 73/025; B29C 73/02; B29L 2031/3076
See application file for complete search history.

(56) References Cited

U.S. PATENT DOCUMENTS 3,621,892 A    11/1971    Gillespie
3,663,148 A *  5/1972    Walker .................... B29C 39/42
                                                    264/102

(Continued)

FOREIGN PATENT DOCUMENTS

DE    10 2012 207 468    11/2013
FR         2 985 680      7/2013
GB           603593       6/1948

OTHER PUBLICATIONS

Machine generated English translation of abstract for DE 10 2012 207 468, downloaded from Espacenet.com on Oct. 6, 2017.
(Continued)

*Primary Examiner* — Christopher T Schatz
*Assistant Examiner* — Cynthia L Schaller
(74) *Attorney, Agent, or Firm* — Dascenzo Intellectual Property Law, P.C.

(57) ABSTRACT

Presently disclosed systems and methods for depositing a compound into a void in a sandwich panel or other structure are configured to reduce the air pressure in and around the void as the compound flows into the void, thereby reducing the amount of air trapped between the compound and the sandwich panel skin (under the compound, within the void) during the repair. Additionally or alternatively, presently disclosed systems and methods for deaerating a compound are configured to remove trapped air from the compound prior to use of the compound (e.g., prior to depositing the compound within a void for repairing the void). In some examples, the same system is configured to both deaerate the compound and deposit the deaerated compound to the void, all while in a reduced air pressure environment inside a vacuum chamber.

18 Claims, 10 Drawing Sheets

(51) Int. Cl.
*B29C 37/00* (2006.01)
*B64F 5/40* (2017.01)
*B29L 31/30* (2006.01)

(52) U.S. Cl.
CPC ............ *B29C 37/006* (2013.01); *B29C 73/02* (2013.01); *B29C 73/025* (2013.01); *B64F 5/40* (2017.01); *B29L 2031/3076* (2013.01)

(56) References Cited

U.S. PATENT DOCUMENTS

| | | | |
|---|---|---|---|
| 4,228,832 A | | 10/1980 | Brown |
| 4,280,861 A | | 7/1981 | Schwartz |
| 4,294,652 A | * | 10/1981 | Newman .................. B01D 3/06 159/2.1 |
| 4,392,874 A | * | 7/1983 | Yamauchi .......... B01D 19/0047 96/200 |
| 4,744,957 A | * | 5/1988 | Imai ......................... B01D 1/16 159/13.1 |
| 6,014,970 A | | 1/2000 | Ivri et al. |
| 7,942,955 B2 | * | 5/2011 | Streiff ................ B01D 19/0047 159/22 |
| 2007/0214964 A1 | | 9/2007 | Miyashita et al. |
| 2011/0183029 A1 | | 7/2011 | Schibsbye |
| 2013/0228956 A1 | | 9/2013 | Sekido et al. |
| 2015/1273742 | | 10/2015 | Takano et al. |

OTHER PUBLICATIONS

Machine generated English translation of abstract for FR 2 985 680, downloaded from Espacenet.com on Oct. 6, 2017.
European Patent Office, Extended European Search Report for related European patent application EP 17155953, dated Aug. 2, 2017.
Sge, "Syringes with Valves", Internet Archive Capture from SGE.com/products/syringes/syringes-with-valves, Apr. 14, 2015.

* cited by examiner

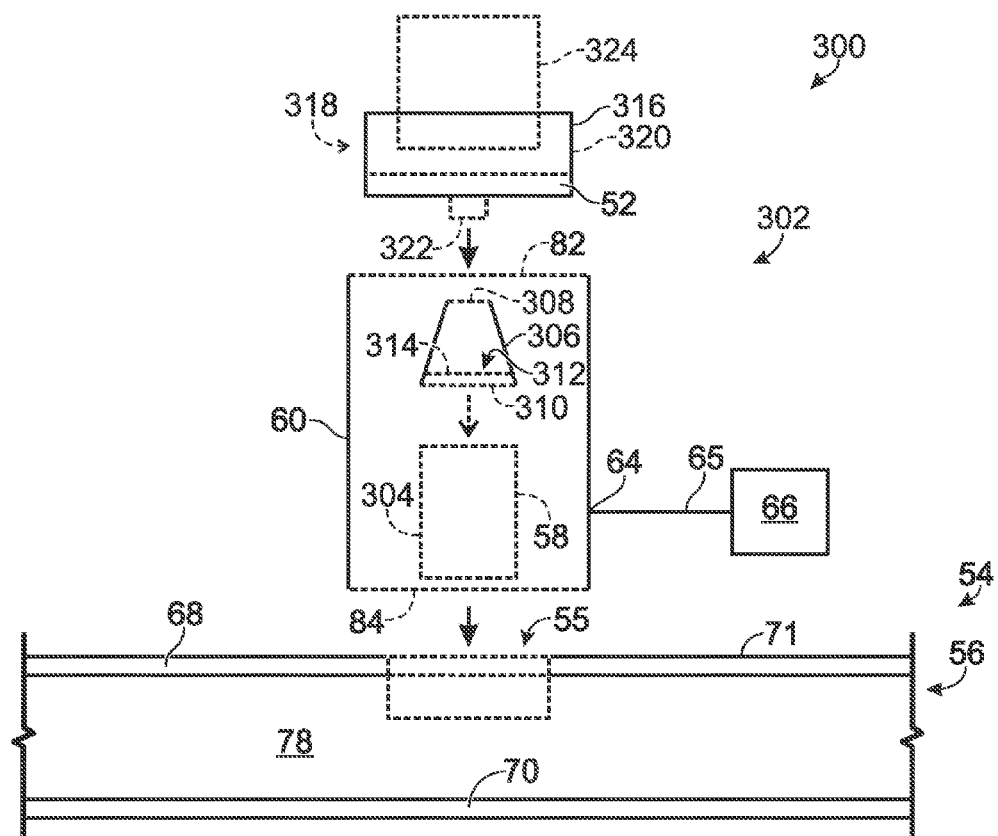
Fig. 11
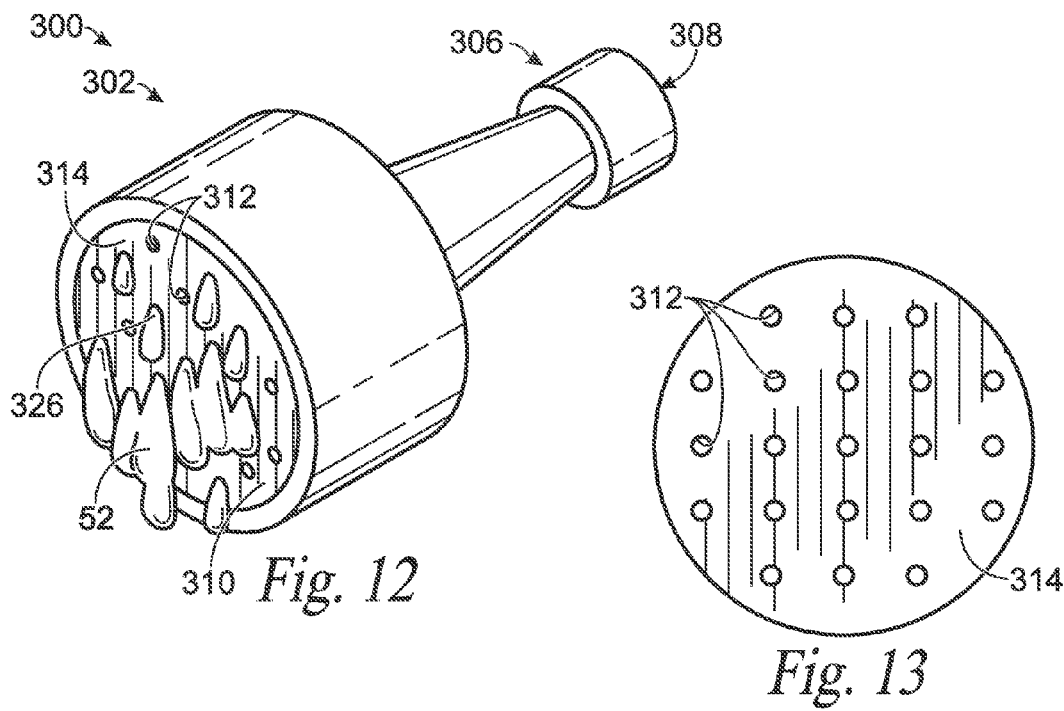
Fig. 12
Fig. 13

SYSTEMS AND METHODS FOR VISCOUS MATERIAL VACUUM DEAERATION, AND SYSTEMS AND METHODS FOR DEPOSITING COMPOUNDS IN A STRUCTURE

CROSS-REFERENCE TO RELATED APPLICATION

This application is a continuation-in-part of U.S. Nonprovisional patent application Ser. No. 15/063,854 filed on Mar. 8, 2016, the entire disclosure of which is incorporated herein by reference for all purposes.

FIELD

The present disclosure relates to systems and methods for viscous material vacuum deaeration. The present disclosure also relates to systems and methods for depositing compounds into a void within a structure.

BACKGROUND

Sandwich panels (e.g., a core structure sandwiched between two layers of material, or skins) are often used in the construction of aircraft, because they have high strength to weight ratios. FIG. 1 illustrates a conventional sandwich panel 11, shown schematically in cross-section. Sandwich panel 11 may include a core 13 sandwiched between a first skin 15 and a second skin 17. First skin 15 and second skin 17 may be rigid or semi-rigid skins, and are typically relatively thin compared to core 13, which is typically formed of a lightweight material. In the aerospace industry, such sandwich panels may be used to assemble the interior main structure and/or secondary structures of the aircraft, and/or may be used to form floor boards, wall panels, galleys, stow bins, overhead compartments, lavatories, and/or other structures within the aircraft. Such sandwich panels are also used in other industries. For example, such sandwich panels may be useful in the aerospace, automotive, electronic, construction, military, recreation, and/or motorsport industries.

Damage to sandwich panels is typically repaired by flowing or injecting an adhesive material, such as a potting compound or epoxy, into or at the damaged area. However, the quality of these repairs may be unpredictable due to air that may become entrapped between the potting compound and a panel skin (e.g., second skin 17). The entrapped air may therefore inhibit the ability of the potting compound to completely fill the void in the sandwich panel.

Air trapped within the potting compound (e.g., porosity) may also result in unpredictable repair quality. Potting compound is often formed by mixing two parts together, and such mixing often incorporates air into the resulting mixture. Existing methods for deaerating (e.g., removing entrapped or encapsulated air from, also referred to as degassing) the potting compound involve the use of expensive, non-portable machines that apply centrifugal force to the potting compound to remove trapped air. In addition to these disadvantages to the use of such machines, the deaeration process must also be performed outside of the mechanism or device being used to place the compound in the void or other intended location.

SUMMARY

Presently disclosed systems and methods for depositing a compound into a void within a structure may be configured to reduce the amount of air trapped beneath the compound (e.g., a potting compound) deposited within the structure (e.g., a sandwich panel). Presently disclosed systems and methods for deaerating a compound (e.g., a viscous material) may be configured to deaerate compounds prior to depositing the compound into a void within a structure. Presently disclosed systems may be configured to deaerate the compound, deposit the compound, or both deaerate and deposit the compound within the same system. Similarly, presently disclosed methods may include deaerating the compound, depositing deaerated compound, or both deaerating and depositing the compound.

For example, presently disclosed systems for depositing a compound include a dispenser for holding the compound to be dispensed into the void, a vacuum canister, and a valve operable in a first position to retain the compound in the dispenser, and operable in a second position to enable the compound to flow into the void while the air pressure within the void is being maintained at a reduced air pressure. In some examples, the vacuum canister includes a canister inlet configured to allow the compound to flow from the dispenser into at least a portion of the vacuum canister, a canister outlet configured to allow the compound to flow into the void, and a vacuum port configured to enable a vacuum system to reduce the air pressure within the vacuum canister and the void to the reduced air pressure. The vacuum canister may be configured to be selectively positioned with respect to the void such that the canister outlet circumscribes the void. In some systems, the dispenser and vacuum canister are integrally formed, and the dispenser is pre-filled with the compound. In other systems, the dispenser and vacuum canister are formed as separate components that are coupled together prior to use. In some examples, at least a portion of the disclosed systems are configured to be disposable after a single use.

Presently disclosed methods for depositing a compound into a void within a structure may include positioning a vacuum canister with respect to the void such that a canister outlet of the vacuum canister circumscribes the void, and drawing air out of the vacuum canister and the void such that a pre-determined reduced air pressure is maintained within the vacuum canister (compared to ambient air). Air may be drawn out of the vacuum canister using a vacuum system operably coupled to the vacuum canister via a vacuum port. The pre-determined reduced air pressure may be referred to as a "target air pressure" or a "target reduced air pressure." Methods may also include moving a valve from a first position to a second position during a period of time in which the target air pressure is maintained, and exposing the compound and the void to ambient air pressure after the period of time during which the pre-determined reduced air pressure is maintained. The reduced air pressure may be maintained for a period of time that is sufficient to allow the compound to flow from the dispenser into the void. The exposing the compound and the void to the ambient air pressure may be performed before the compound has dried, gelled, or cured. Moving the valve from the first position to the second position may be configured to allow the compound to flow from the dispenser, through at least a portion of the vacuum canister, and into the void. In this manner, voids in sandwich panels may be repaired with improved results, as compared to conventional techniques.

Presently disclosed systems for deaerating a compound may include a delivery apparatus having a deaerator head, a plurality of apertures through which the compound is directed, and a vacuum chamber in which the deaerator head and the plurality of apertures are selectively positioned. The deaerator head may include a deaerator inlet configured for receiving a volume of compound and a deaerator outlet opposite and larger than the deaerator inlet. The plurality of apertures may be positioned with respect to the deaerator inlet and the deaerator outlet such that respective portions of the volume of compound received into the deaerator head through the deaerator inlet pass through respective apertures of the plurality of apertures before exiting the deaerator head through the deaerator outlet. The vacuum chamber may be configured to contain or receive the deaerator head and the plurality of apertures while the volume of compound is deaerated. In this manner, the delivery apparatus may be configured to receive and deaerate the volume of compound while the deaerator head and the plurality of apertures are maintained at a reduced air pressure in the vacuum chamber. The plurality of apertures may be sized to increase a ratio of surface area to volume of the volume of compound as the volume of compound passes through the plurality of apertures, and thus configured to deaerate the compound as it passes through the deaerator head.

Presently disclosed methods for deaerating a compound may include reducing an air pressure within the vacuum chamber to a reduced air pressure and flowing the volume of compound through the deaerator head and the plurality of apertures while the deaerator head and the plurality of apertures are maintained at the reduced air pressure within the vacuum chamber, thereby deaerating the volume of compound. The flowing the volume of compound through the deaerator head may be performed such that respective portions of the volume of compound received into the deaerator head through the deaerator inlet pass through respective apertures of the plurality of apertures before exiting the deaerator head through the deaerator outlet, and the apertures may be sized and configured to cause trapped air to escape into the vacuum chamber as the compound is forced through the plurality of apertures.

BRIEF DESCRIPTION OF THE DRAWINGS

FIG. 11 is an exploded schematic view of illustrative, non-exclusive examples of systems for deaerating a compound, according to the present disclosure.

FIG. 12 a schematic perspective view of an illustrative, non-exclusive example of a delivery apparatus for deaerating a compound, according to the present disclosure.

FIG. 13 is a plan view of an example of a plate insert for use with a delivery apparatus for deaerating a compound, according to the present disclosure.

DESCRIPTION

Systems and methods for depositing a compound into a void within a structure and/or for deaerating a compound are disclosed. Examples are generally disclosed as depositing a potting compound into a honeycomb sandwich panel (or deaerating a potting compound or other viscous material), but depositing other compounds into other structures and/or deaerating other compounds are also within the scope of the present disclosure. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 2:
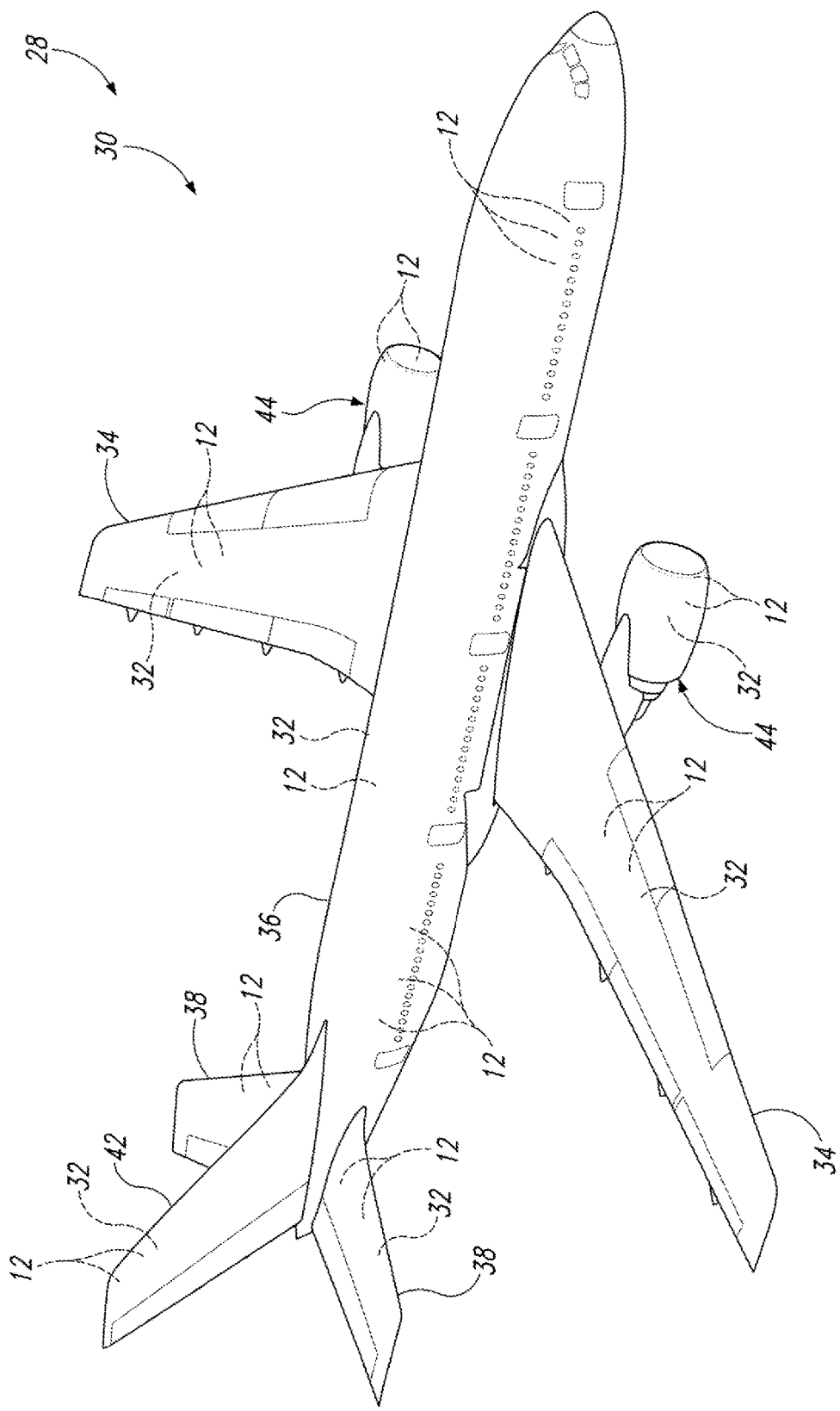
FIG. 2 is a perspective, schematic view of illustrative, non-exclusive examples of an apparatus that may include one or more structures repaired and/or manufactured according to the present disclosure.

With reference to FIG. 2, an example of an apparatus 28 that may include one or more sandwich panels 12 generally is illustrated in the form of an aircraft 30. Aircraft 30 may take any suitable form, including commercial aircraft, military aircraft, or any other suitable aircraft. While FIG. 2 illustrates an aircraft 30 in the form of a fixed wing aircraft, other types and configurations of aircraft are within the scope of aircraft 30 according to the present disclosure, including (but not limited to) rotorcraft and helicopters.

Apparatus 28 (e.g., aircraft 30) may include one or more structures 32 formed from one or more sandwich panels 12, one or more of which may be composite panels. Each sandwich panel 12 includes a core formed of a relatively lightweight material, sandwiched between two panel skins. Structures 32 may include one or more sandwich panels 12, joints formed between two or more sandwich panels 12, and/or three-dimensional structures formed using one or more sandwich panels 12. As illustrative, non-exclusive examples, structures 32 may be utilized in such aircraft structures as wings 34, fuselages 36, horizontal stabilizers 38, vertical stabilizers 42, and engine housings 44; however, other components of aircraft 30 additionally or alternatively may include structures 32 such as sandwich panels 12 and/or joints formed between two or more sandwich panels 12. Other applications in aircraft 30 for sandwich panels 12 include overhead storage bins, floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, apparatus 28 (including one or more sandwich panels 12) may include or be a portion of space satellites, electronic radome construction, transit vehicles, shipping containers, shelters, large antennae or disk reflectors, refrigeration panels, rapid transit floor panels, shipboard electronic deck shelters, cargo pallets, automobile bodies, architectural curtain walls, partitions, divider panels, expandable hospital shelters, and/or interior structures of an assembly.

Figure 1:
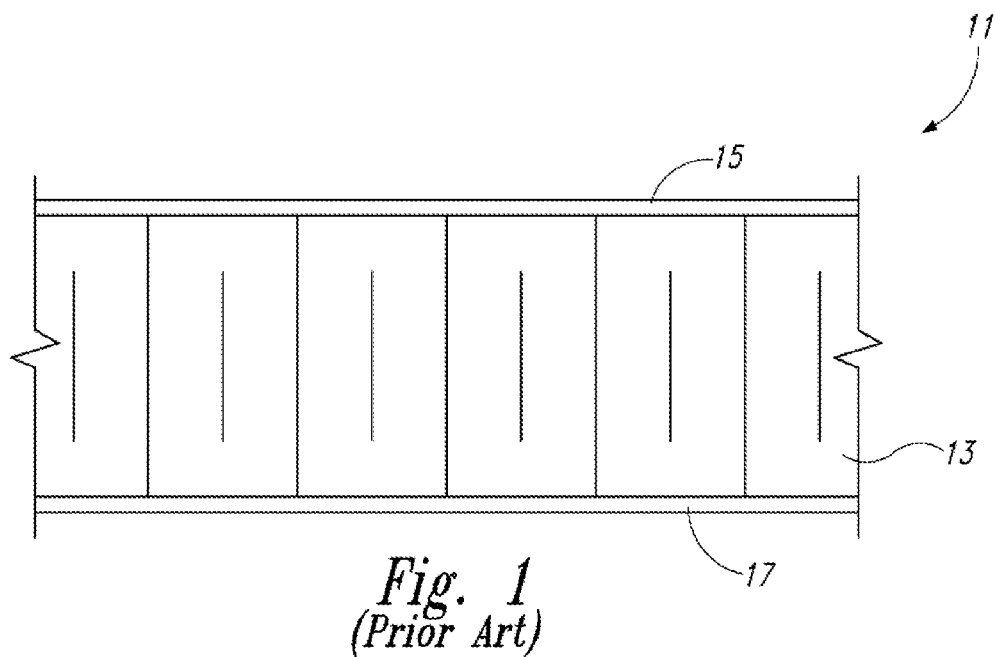
FIG. 1 is a schematic, cross-section view of a conventional sandwich panel.
Figure 3:
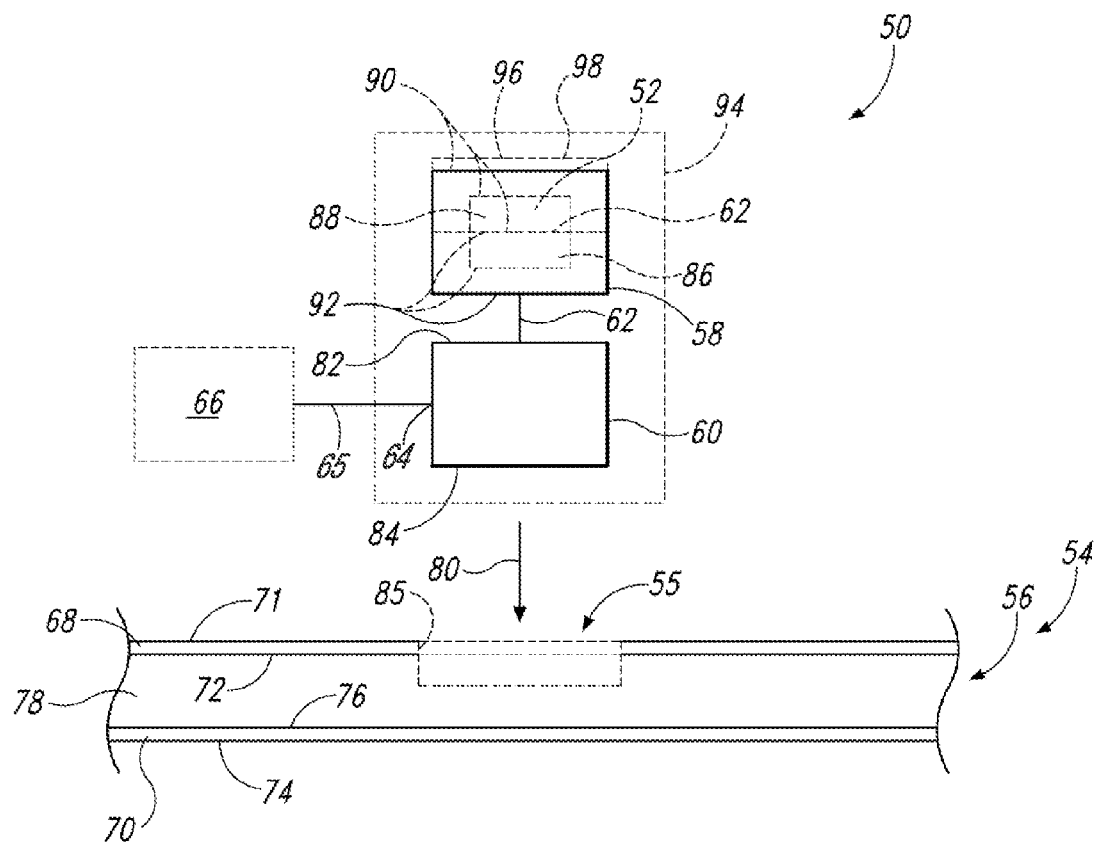
FIG. 3 is a schematic view of illustrative, non-exclusive examples of systems for depositing a compound within a void in a structure, according to the present disclosure.

Damage to sandwich panels 12 may be repaired using systems and methods according to the present disclosure. FIG. 3 shows a schematic representation of systems 50 for depositing a compound 52 into a structure 54 (which is an example of structure 32), such as into a void 55 of a sandwich panel 56 (of which sandwich panel 12 is an example). Systems 50 generally include a dispenser 58 for holding compound 52, a vacuum canister 60 (which may also be referred to as a vacuum chamber 60), and a valve 62. Generally, dispenser 58 is configured to deliver compound 52 to a location of structure 54 (e.g., to void 55) while under reduced air pressure. Vacuum canister 60 includes a vacuum port 64 that is configured to enable a vacuum system 66 (e.g., a vacuum pump 66) to reduce the air pressure within vacuum canister 60 and void 55 to a target air pressure. For example, once an external vacuum system 66 is selectively operatively coupled to vacuum canister 60 via vacuum port 64 and a vacuum tube 65, vacuum system 66 draws air out from within vacuum canister 60 and void 55. Systems 50 are configured to maintain a desired or pre-determined reduced air pressure for a period of time sufficient to allow compound 52 to flow from dispenser 58 into void 55. After compound 52 is delivered or deposited or flowed to the desired location (e.g., to void 55), ambient air pressure is restored in vacuum canister 60, and thereby void 55 and compound 52 are exposed to ambient air pressure that compresses pockets of air trapped between compound 52 and a panel skin (e.g., a second skin layer 70), thereby reducing the size of said pockets of air. For example, vacuum system 66 is decoupled from vacuum port 64 and/or vacuum system 66 is reversed such that air is pumped back into vacuum canister 60. Vacuum port 64 is coupled to vacuum canister 60, formed integrally with vacuum canister 60, and/or removable from vacuum canister 60. The repair is typically untouched for a sufficient time to enable compound 52 to completely cure.

Still with reference to FIG. 3, sandwich panel 56 includes a first skin layer 68 and second skin layer 70. First skin layer 68 has a first outer surface 71 and a first inner surface 72. Similarly, second skin layer 70 has a second outer surface 74 and a second inner surface 76. A core 78 extends between first inner surface 72 and second inner surface 76, such that first skin layer 68 and second skin layer 70 are positioned on opposites sides of core 78 from one another. First skin layer 68 is arranged such that first outer surface 71 faces outwardly and away from core 78. Similarly, second skin layer 70 is arranged such that second outer surface 74 faces outwardly and away from core 78. Sandwich panel 56 is formed of any suitable materials, having a flexible, rigid, or semi-rigid first skin layer 68, and a flexible, rigid, or semi-rigid second skin layer 70, and core 78 there between.

Generally, first skin layer 68 and second skin layer 70 are relatively thin sheets or plates, while core 78 may have a thickness that is significantly greater than the respective thicknesses of first skin layer 68 and second skin layer 70. In some examples, the density of core 78 is less than that of first skin layer 68 and second skin layer 70. For example, in the exemplary embodiment, core 78 is formed of a lightweight material formed into a plurality of elongate cells having hexagonal or rectangular cross-sections. Such cores 78 are referred to as honeycomb cores, but other shapes and configurations also may be used, such as a corrugated structure and/or foam materials. Cores 78 of sandwich panels 56 may include an open-cell structure and/or a closed-cell structure. Cores 78 of sandwich panels 56 may be formed of foam, aluminum, Nomex® (aramid), carbon, Korex, Kevlar®, fiberglass, polyethersufone, polyvinylchloride, polyurethane, polyethylene foam, polystyrene foam, balsa wood, syntactic foam, a honeycomb structure, a polymer honeycomb, a thermoplastic honeycomb, stainless steel, polycarbonate, and/or polypropylene. Sandwich panel 56 is, for example, a honeycomb core sandwich panel, but other constructions are contemplated within the scope of the present disclosure. First skin layer 68 and second skin layer 70 may be, a laminate of fiberglass-reinforced polymer, a laminate of carbon fiber-reinforced polymer, a thermoset polymer, an epoxy, sheet metal, carbon, aramid, aluminum, steel, plywood, balsa, teak, and/or hardwood.

Void 55 may be, for example, a damaged area of sandwich panel 56. Void 55 may include a damaged portion of first skin 68, second skin 70, and/or core 78, and may extend through a portion of the thickness of sandwich panel 56 or all the way through sandwich panel 56. Dispenser 58 is configured to contain a sufficient volume of compound 52 to fill and/or repair void 55 of sandwich panel 56. Valve 62 is operable in a first position to retain compound 52 in dispenser 58 and operable in a second position to enable compound 52 to flow into void 55 while the air pressure within void 55 is being maintained at a reduced air pressure. For example, compound 52 flows generally in the direction indicated by arrow 80—from dispenser 58, through at least a portion of vacuum canister 60, and into void 55.

Vacuum canister 60 may be any structure capable of maintaining a reduced air pressure environment therein, and typically includes a canister inlet 82 (also referred to herein as chamber inlet 82) configured to allow compound 52 to flow from dispenser 58 into at least a portion of vacuum canister 60. Vacuum canister 60 also includes a canister outlet 84 (also referred to herein as chamber outlet 84) configured to allow compound 52 to flow into void 55 (e.g., out of vacuum canister 60). Vacuum canister 60 is configured to be selectively positioned with respect to void 55 such that canister outlet 84 circumscribes void 55. Canister outlet 84 is said to circumscribe void 55 when an outer perimeter of canister outlet 84 is positioned with respect to structure 54 such that canister outlet 84 surrounds an opening 85 through first outer surface 71 of sandwich panel 56 which forms part of void 55. For example, canister outlet 84 includes an opening that is at least as large as opening 85 of void 55, such that canister outlet 84 surrounds opening 85 and such that a seal is formed between canister outlet 84 and first outer surface 71 when a vacuum is applied. In the exemplary embodiment, canister outlet 84 is approximately the same size and shape as opening 85 of void 55. Optionally, canister outlet 84 is larger than opening 85 of void 55 and/or a different shape. In some examples, vacuum canister 60 is positioned with respect to first outer surface 71 of sandwich panel 56 such that canister outlet 84 is adjacent to and in physical contact with first outer surface 71. In some examples, vacuum canister 60 (e.g., canister outlet 84 of vacuum canister 60) is positioned on sandwich panel 56 (e.g., on first outer surface 71). A seal is then formed between vacuum canister 60 and structure 54 (e.g., between canister outlet 84 and sandwich panel 56) such that air is substantially prevented from entering vacuum canister 60 at the intersection of vacuum canister 60 and sandwich panel 56 (e.g., systems 50 include an air-impermeable seal between structure 54 and vacuum canister 60). Such seals may include, for example, a gasket, a sealant tape, an adhesive, a sealant compound, and/or a film. In some examples, vacuum canister 60 may surround at least a portion of dispenser 58, and/or dispenser 58 may be contained within a volume defined between vacuum canister 60 and structure 54.

Vacuum canister 60 (e.g., canister inlet 82) may be configured to selectively and removably receive at least a portion of dispenser 58. For example, at least a portion of dispenser 58 may be inserted into or through canister inlet 82, and/or at least a portion of dispenser 58 may be contained within vacuum canister 60. Additionally or alternatively, canister inlet 82 may be configured to receive compound 52 from dispenser 58. In other words, compound 52 may flow directly into vacuum canister 60 by flowing directly through canister inlet 82, and/or compound 52 may flow into vacuum canister 60 indirectly, by flowing through a portion of dispenser 58 that is positioned within canister inlet 82.

In one example, dispenser 58 includes a dispenser inlet 90 to receive compound 52 and a dispenser outlet 92 configured to channel compound 52 toward void 55. In some examples, dispenser outlet 92 is configured to channel compound 52 into vacuum canister 60. In some examples, dispenser inlet 90 and dispenser outlet 92 are different from each other. In other examples, the same opening serves as dispenser inlet 90 and dispenser outlet 92. For example, dispenser 58 may include a single opening (e.g., dispenser outlet 92) that is configured to both receive compound 52 into dispenser 58, and allow compound 52 to exit dispenser 58 and flow towards void 55.

In some systems 50, dispenser 58 is a two-part dispenser. For example, dispenser 58 may include a first portion 86 and a second portion 88. In some examples, second portion 88 is configured to hold a volume of compound 52 and deliver that volume to first portion 86, while first portion 86 is configured to be positioned with respect to void 55 such that compound 52 flows through first portion 86 to void 55. Second portion 88 is pre-filled with compound 52, or second portion 88 is filled with compound 52 at the time of use, such as through dispenser inlet 90. In some systems 50, second portion 88 includes a first dispenser inlet 90 for receiving compound 52, and first portion 86 includes a second dispenser inlet 90 for receiving compound 52 from second portion 88.

In some examples, dispenser outlet 92 is positioned between second portion 88 and first portion 86 such that dispenser outlet 92 is configured to channel compound 52 from second portion 88 into first portion 86 (e.g., into a respective dispenser inlet 90 of first portion 86). Additionally or alternatively, dispenser outlet 92 is configured to channel compound 52 from first portion 86, through at least a portion of vacuum canister 60 (e.g., dispenser 58 may include a plurality of dispenser outlets 92 in some examples, such as a first dispenser outlet 92 formed in second portion 88 that leads to first portion 86, and a second dispenser outlet 92 formed in first portion 86 that leads to structure 54). First portion 86 is configured to be positioned on structure 54 (e.g., on first outer surface 71 of sandwich panel 56), such that first portion 86 surrounds void 55. In some such systems 50, a dispenser outlet 92 of first portion 86 is positioned facing and/or adjacent structure 54, such that the dispenser outlet circumscribes void 55 (e.g., opening 85 of void 55). Such dispenser outlet 92 is approximately the same size and shape of void 55 in some examples, or the dispenser outlet is larger than void 55 and/or differently shaped in other examples. First portion 86 is removably coupled to structure 54, such as to first outer surface 71 of first skin 68 of sandwich panel 56. For example, first portion 86 is configured to be coupled to structure 54 with one or more of a gasket, a seal, a fitting, a film, a coating, an adhesive, a sealant, and a tape.

In some systems 50 having a two-part dispenser, first portion 86 and second portion 88 are selectively removable from each other. For example, first portion 86 of dispenser 58 is configured to selectively and removably receive at least some of second portion 88 of dispenser 58. Additionally, second portion 88 is configured to be removably placed onto first portion 86, and/or second portion 88 may be configured to be removably coupled to first portion 86. In yet other examples, first portion 86 and second portion 88 are integrally formed.

In systems 50 where dispenser 58 is a two-part dispenser, the two parts are shaped differently to facilitate their functioning. For example, first portion 86 is substantially cylindrical in some examples. Second portion 88 is a funnel or substantially funnel-shaped in some examples. Dispenser 58 (e.g., first portion 86 and/or second portion 88) is sized to hold a sufficient volume of compound 52 to repair void 55.

One or more valves 62 are positioned between vacuum canister 60 and dispenser 58 in some examples. Additionally or alternatively, one or more valves 62 are positioned between second portion 88 of dispenser 58 and first portion 86 of dispenser 58. Additionally or alternatively, one or more valves 62 are positioned between first portion 86 of dispenser 58 and vacuum canister 60. In some examples, one or more valves 62 are coupled to dispenser 58, or form a portion thereof. One or more valves 62 are selectively moveable such that compound 52 is retained in at least a portion of dispenser 58 when valve 62 is in the first position (e.g., valve 62 is configured to at least substantially prevent flow of compound 52 through dispenser outlet 92 when valve 62 is in the first position), and such that compound 52 flows towards void 55 when valve 62 is in the second position. For example, moving valve 62 to the second position allows compound 52 to flow through dispenser outlet 92 and into, e.g., first portion 86 of dispenser 58 and/or vacuum canister 60. In some examples, moving valve 62 to the second position includes selectively removing valve 62 from dispenser 58 entirely, such that valve 62 is remote from dispenser 58 and dispenser outlet 92. In some of these examples, valve 62 is selectively replaceable on dispenser outlet 92.

In some examples, valve 62 is a simple mechanical structure, such as a tape, an adhesive, a hinge, a sliding structure, a cover, a pivoting structure, a ball valve, a butterfly valve, a check valve, a disc valve, a diaphragm valve, and a snap-fit structure. Any valve structure that is configured to function as described may be used for valve 62. In some systems 50, valve 62 is configured to be moved between the first position and the second position by remote activation. Additionally or alternatively, valve 62 is selectively moveable to the second position by manual manipulation of valve 62. In some examples, valve 62 is configured to be selectively moved to the second position by an actuator. In yet other examples, valve 62 is configured such that it automatically moves to the second position (e.g., allowing flow of compound 52 out of dispenser 58) when a target reduced air pressure is reached inside vacuum canister 60. Valve 62 is moved to the second position at any suitable point in the process for various systems, such as before vacuum canister 60 is placed with respect to structure 54, when a second portion 88 of dispenser 58 is positioned with respect to a first portion 86, and/or when dispenser 58 is positioned with respect to vacuum canister 60.

As indicated by dashed line, dispenser 58 and vacuum canister 60 may be formed unitarily with each other such that dispenser 58 and vacuum canister 60 are formed as a unitary assembly 94. For example, in some systems 50, dispenser 58 and vacuum canister 60 are formed integrally with one another. In other examples, dispenser 58 and vacuum canister 60 are coupled to one another and/or formed separately from one another.

Vacuum system 66 may be configured to reduce the air pressure within vacuum canister 60 until the air pressure within vacuum canister 60 reaches a prescribed (e.g., predetermined) target pressure. The target pressure will be determined by the viscosity of the potting compound and the depth and the cross section of the structure and damage to be repaired. In practice the target air pressure may fall within the range of 10-29 inches of mercury ("in Hg") below atmospheric pressure for common potting compounds used for repair of honeycomb panels between 2 and 6 inches thick. Vacuum system 66 is configured to reduce the air pressure within vacuum canister 60 and is configured to maintain the target reduced air pressure for a prescribed duration of time sufficient to allow the potting compound to flow into the void. In practice the target air pressure may be maintained long enough for common potting compounds used for repair of honeycomb core panels between 2 and 6 inches thick, leaving sufficient time before the potting compound cures and hardens, for voids between the potting compound to be compressed when ambient pressure is restored to the repaired area. Vacuum system 66 is also configured to restore ambient air pressure within vacuum canister 60 at a prescribed rate. Vacuum system 66 may be manually controlled and/or computer-controlled.

Dispenser 58 and vacuum canister 60 may be any suitable size and shape. Compound 52 is any suitable compound for repairing void 55, such as an adhesive, a potting compound, a UV-cure compound, and/or a quick-cure compound. Compound 52 is configured to flow from dispenser 58 into void 55 (e.g., compound 52 has a viscosity such that it flows through dispenser outlet 92, through at least a portion of vacuum canister 60, and into void 55.

Systems 50 may be fabricated using one or more disposable components. For example, in some examples, dispenser 58 is configured to be disposed of after a single use. Additionally or alternatively, vacuum canister 60 is configured to be disposed of after a single use. In some examples, system 50 is configured to include an integrally-formed dispenser 58 and vacuum canister 60 assembly 94 that is pre-filled with compound 52 in dispenser 58, where the entire assembly 94 is configured to be disposable after a single use. For example, assembly 94 is coupled to vacuum system 66 via vacuum port 64, the compound 52 already contained within dispenser 58 of assembly 94 flows to void 55, and then assembly 94 is decoupled from vacuum system 66 and disposed of.

In some systems 50, dispenser 58 includes a cover or lid 96, which is configured to cover or seal dispenser inlet 90. Lid 96 is removable in some examples, such that it is configured to selectively cover dispenser inlet 90. For example, dispenser inlet 90 receives compound 52 into dispenser 58 when lid 96 is removed, and lid 96 is configured to prevent compound 52 from flowing through dispenser inlet 90 when lid 96 is positioned to cover dispenser inlet 90. Additionally or alternatively, systems 50 may include a dispenser seal 98 configured to selectively seal dispenser inlet 90, such that dispenser inlet 90 may receive compound 52 into dispenser 58 before dispenser inlet 90 is sealed with dispenser seal 98, and dispenser seal 98 is configured to prevent compound 52 from flowing through dispenser inlet 90 once dispenser inlet 90 is sealed with dispenser seal 98.

Components may be combined, joined, and/or take other forms, to perform the same functions as described above. Presently disclosed systems 50 may have particular utility in repairing sandwich panels where only one side of the sandwich panel may be accessible. Moreover, if damage extends from through the first skin layer 68 through the second skin layer 70, a temporary plastic film or sealant, for example, may be used to temporarily seal the opening to enable the pressure within the panel to be reduced.

Turning now to FIGS. 4-7, illustrative non-exclusive examples of systems 50 are illustrated. While FIGS. 4-7 are less schematic than FIG. 3, they are still schematic in nature. Where appropriate, the reference numerals from the schematic illustration of FIG. 3 are used to designate corresponding parts of the examples of FIGS. 4-7; however, the examples of FIGS. 4-7 are non-exclusive and do not limit systems 50 to the illustrated embodiments of FIGS. 4-7. That is, systems 50 are not limited to the specific embodiments of FIGS. 4-7, and systems 50 may incorporate any number of the various aspects, configurations, characteristics, properties, etc. of systems 50 that are illustrated in and discussed with reference to the schematic representation of FIG. 3 and/or the embodiments of FIGS. 4-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 4-7; however, it is within the scope of the present disclosure that the previously discussed features, variants, etc. may be utilized with the examples of FIGS. 4-7.

Figure 4:
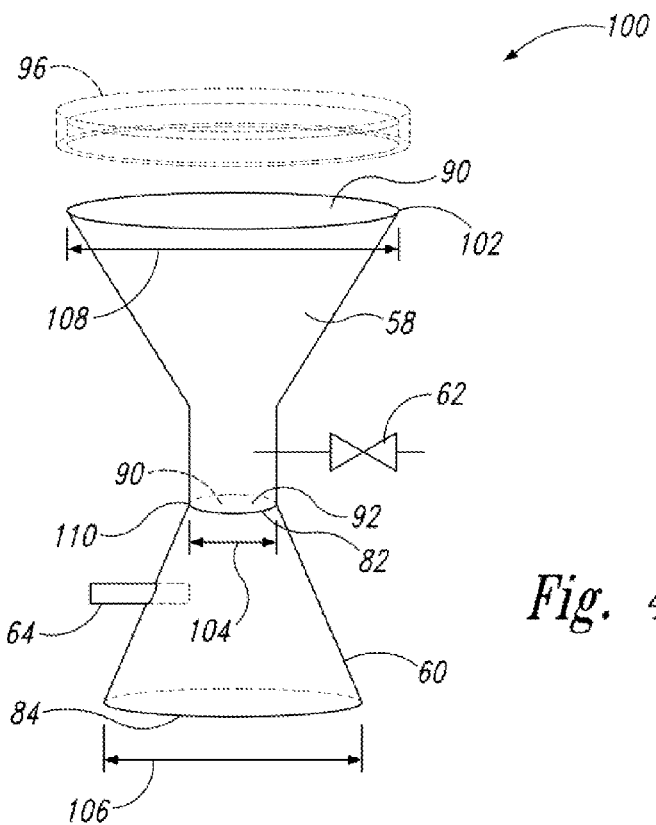
FIG. 4 is a schematic elevation view of illustrative, non-exclusive examples of systems for depositing a compound within a void in a structure, according to the present disclosure.

FIG. 4 illustrates an example of system 50, in the form of a system 100. System 100 includes dispenser 58 and vacuum canister 60, with valve 62 positioned between dispenser 58 and vacuum canister 60. Vacuum port 64 is coupled to vacuum canister 60 to enable a vacuum system (e.g., vacuum system 66 of FIG. 3) to be coupled to system 100. Dispenser 58 may include lid 96, or may be sealed at an end 102. As shown in FIG. 4, a first diameter 104 of canister inlet 82 is smaller than a second diameter 106 of canister outlet 84. Dispenser outlet 92 has a smaller diameter than the diameter of end 102 of dispenser 58. In some examples, the diameter of dispenser outlet 92 is substantially equal to the diameter of canister inlet 82 (e.g., first diameter 104), and/or the diameter adjacent end 102 may be a larger, third diameter 108 (which may be smaller than, approximately equal to, or larger than second diameter 106 of canister outlet 84). Canister inlet 82 is configured to receive the compound from dispenser 58.

Dispenser 58 may be coupled to vacuum canister 60, formed integrally with vacuum canister 60, and/or selectively removable from vacuum canister 60. In examples where dispenser 58 is formed integrally with vacuum canister 60, dispenser outlet 92 is adjacent canister inlet 82, with dispenser inlet 90 being adjacent end 102 of dispenser 58. In such examples, dispenser 58 is pre-filled with compound (e.g., compound 52) and sealed at end 102, or the compound is placed into dispenser 58 through dispenser inlet 90, adjacent end 102, and then covered with lid 96 or otherwise sealed. The compound flows through dispenser outlet 92 and into vacuum canister 60 via canister inlet 82 when valve 62 is positioned to allow such flow.

In some examples where dispenser 58 is coupled to vacuum canister 60, end 102 of dispenser 58 is sealed, and the same opening serves as dispenser inlet 90 and dispenser outlet 92. For example, dispenser 58 is at least partially filled with compound through dispenser inlet 90 adjacent a second end 110 of dispenser 58, and then dispenser 58 is coupled to vacuum canister 60 adjacent the same second end 110. Once valve 62 is moved to the second position, the compound flows through the same opening through which it was inserted into dispenser 58 (e.g., the compound flows through dispenser inlet 90, now serving as dispenser outlet 92, adjacent second end 110) and into vacuum canister 60, towards the structure or void adjacent which system 100 is positioned or coupled.

Alternatively, dispenser 58 may be coupled to vacuum canister 60 before or after compound has been placed in dispenser 58, and dispenser inlet 90 and dispenser outlet 92 are positioned on opposite ends of dispenser 58. In some examples, the compound is inserted into dispenser 58 through dispenser inlet 90 adjacent end 102, and then dispenser 58 is coupled to vacuum canister 60 adjacent second end 110 of dispenser 58. In other examples, dispenser 58 is coupled to vacuum canister 60 adjacent second end 110 of dispenser 58, and then dispenser 58 is at least partially filled with compound through dispenser inlet 90, adjacent end 102 of dispenser 58. Whether dispenser 58 is filled with compound before or after dispenser 58 is coupled to vacuum canister 60 in these examples, system 100 is configured such that the compound enters dispenser 58 through a different location (e.g., dispenser inlet 90) than it exits dispenser 58 (e.g., dispenser outlet 92 is different from dispenser inlet 90). Dispenser inlet 90 and dispenser outlet 92 are positioned at other locations of dispenser 58, other than end 102 and second end 110 in some examples. Dispenser 58 and vacuum canister 60 may be arranged with respect to one another such that gravity causes the compound to flow from dispenser 58 towards the void or structure, such as from dispenser outlet 92 into canister inlet 82.

In one example, system 100 is configured to be disposable after a single use. For example, dispenser 58 is pre-filled with compound, with dispenser 58 and vacuum canister 60 formed integrally or pre-coupled together. Such system 100 is used "off-the-shelf," simply by connecting a vacuum system via vacuum port 64, positioning the system 100 with respect to a void to be repaired, and moving valve 62 to allow the compound to flow from dispenser 58, through vacuum canister 60, and into the void, while under vacuum. Once the compound has flowed to the void, system 100 is removed from the structure and disposed of, and the void is exposed to ambient air pressure, and/or the vacuum system may pump air back into vacuum canister 60 to expose the void and compound to an increased air pressure to further compress air trapped between and potting compound and the second side of the core before system 100 is removed from the structure.

Figure 5:
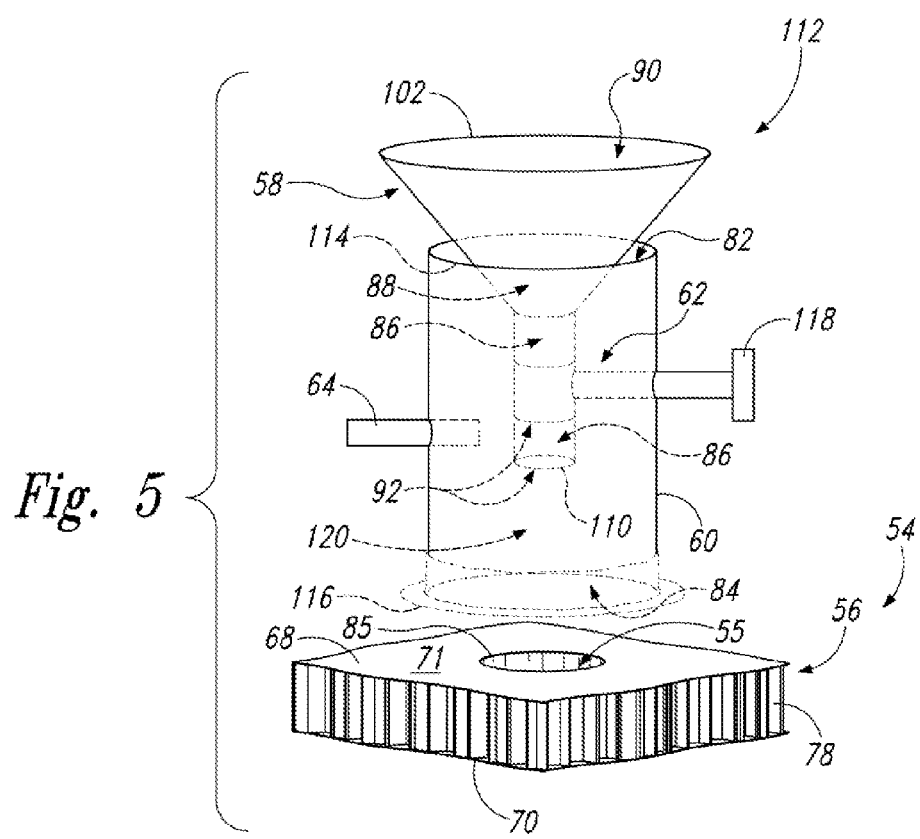
FIG. 5 is a schematic elevation view of illustrative, non-exclusive examples of systems for depositing a compound within a void in a structure, according to the present disclosure.

FIG. 5 schematically illustrates a second system 112, which is another example of system 50. System 112 includes dispenser 58 and vacuum canister 60, which are configured to deliver a compound (e.g., compound 52) to structure 54 (e.g., to void 55 of sandwich panel 56). Dispenser 58 includes dispenser inlet 90, through which the compound is inserted into dispenser 58, and dispenser outlet 92, through which the compound may exit dispenser 58. At least a portion of dispenser 58 is positioned within vacuum canister 60. As shown in FIG. 5, canister inlet 82 is configured to receive at least a part of dispenser 58, such that dispenser 58 is at least partially inserted into vacuum canister 60 through canister inlet 82. In the exemplary embodiment, system 112 includes a seal 114 (also referred to herein as inlet seal 114) adjacent canister inlet 82 such that substantially no air passes between seal 114 and dispenser 58 when dispenser 58 is so positioned.

Vacuum canister 60 is positioned with respect to structure 54 such that canister outlet 84 circumscribes void 55. In some examples, vacuum canister 60 is positioned on structure 54, such as on first outer surface 71 of first skin layer 68 of sandwich panel 56. A lower seal 116 is positioned between vacuum canister 60 and sandwich panel 56 adjacent canister outlet 84. Lower seal 116 (also referred to herein as outlet seal 116) is configured such that substantially no air passes between first outer surface 71 and canister outlet 84. Dispenser 58 is positioned with respect to vacuum canister 60 such that dispenser outlet 92 is positioned within vacuum canister 60. When valve 62 is moved from a first position wherein the compound is retained in dispenser 58 to a second position, the compound flows through dispenser outlet 92, through at least a portion of vacuum canister 60, and into void 55. Valve 62 is operable, such as by a handle or other interface 118 that is accessible outside vacuum canister 60. In this manner, valve 62 is moved (e.g., selectively opened and/or closed) while there is a target reduced air pressure within vacuum canister 60, such that the compound flows to void 55 while the compound, void 55, and a volume 120 are under a reduced air pressure.

In system 112, dispenser 58 is a two-part dispenser, with first portion 86 being positioned within vacuum canister 60, at least some of second portion 88 being positioned within vacuum canister 60, and/or at least some of second portion 88 being positioned outside of vacuum canister 60. Dispenser inlet 90 is formed in second portion 88, and dispenser outlet 92 is formed in first portion 86 in some examples. Valve 62 is positioned between first portion 86 of dispenser 58 and second portion 88 of dispenser 58, such that the compound flows from second portion 88, through valve 62, into first portion 86, and then into vacuum canister 60, towards void 55 in some examples. In some examples, as indicated in dashed line, valve 62 is positioned between first portion 86 of dispenser 58 and vacuum canister 60 such that the compound flows from first portion 86, through valve 62, and into vacuum canister 60, towards void 55. Optionally, dispenser 58 is a unitary dispenser, with valve 62 formed therein, such as adjacent dispenser outlet 92.

Figure 6:
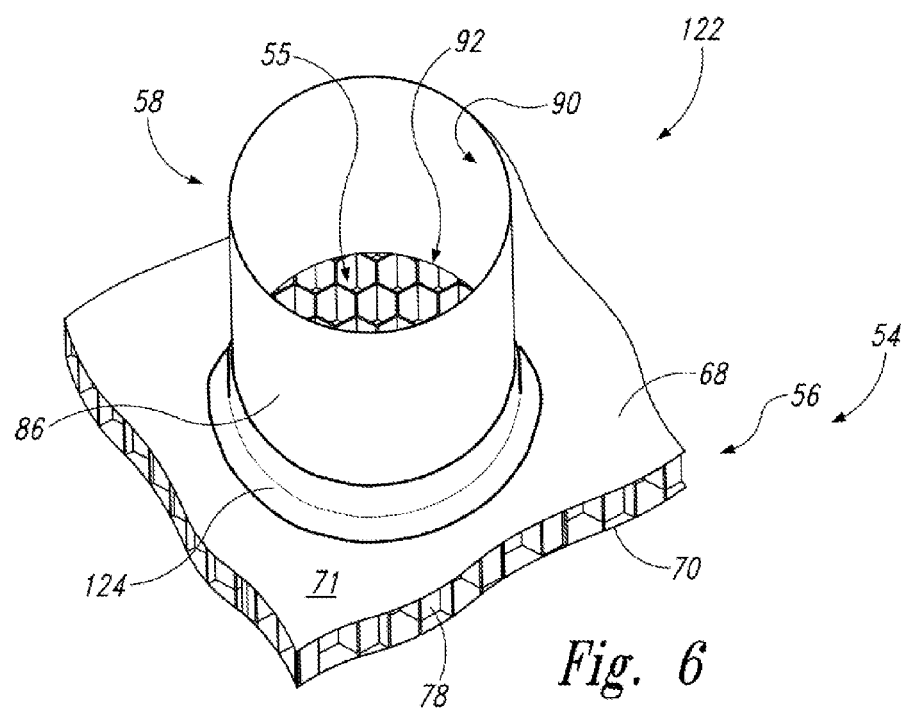
FIG. 6 is a schematic perspective view of an illustrative, non-exclusive example of a portion of a dispenser, according to the present disclosure.
Figure 7:
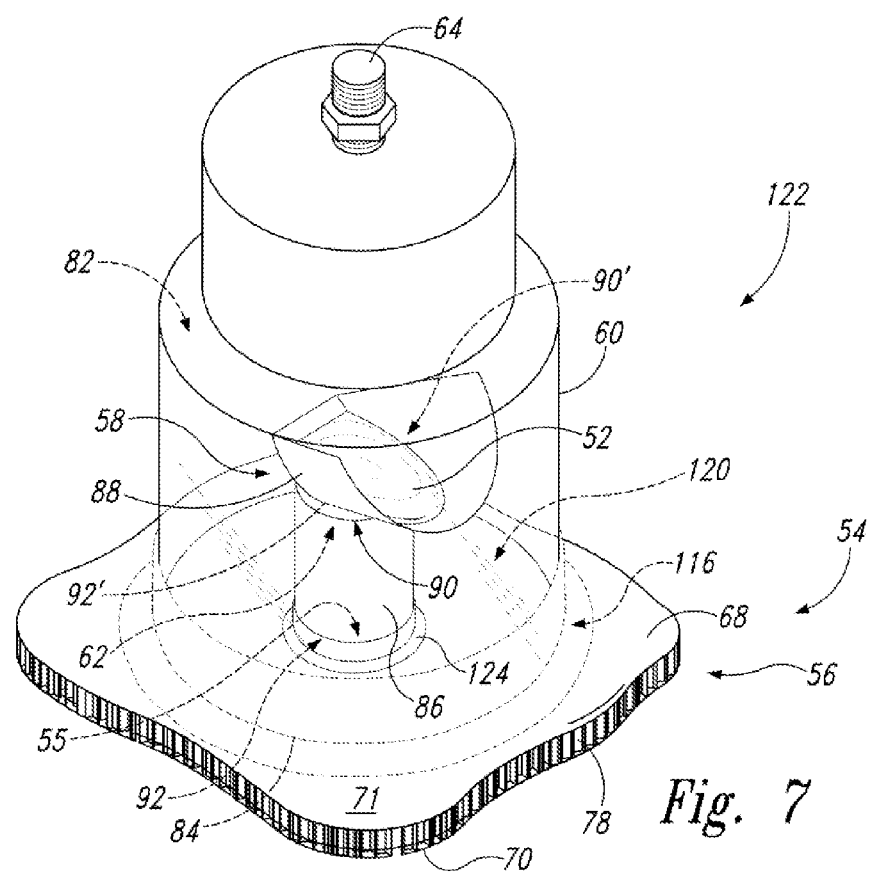
FIG. 7 is a perspective, schematic view of an illustrative non-exclusive example of a system according to the present disclosure, with a vacuum canister surrounding a two-part dispenser, including the portion of the dispenser illustrated in FIG. 6.

FIGS. 6-7 illustrate yet another example of system 50, in the form of system 122. FIG. 6 shows first portion 86 of a two-part dispenser 58 being coupled to first outer surface 71 of first skin 68 of sandwich panel 56 (which is an example of structure 54). For example, a dispenser seal 124 is used to form a seal between first portion 86 of dispenser 58 and sandwich panel 56. As shown in FIG. 6, first portion 86 is formed as a substantially cylindrical, hollow, thin-walled structure. First portion 86 is positioned with respect to sandwich panel 56 and void 55 such that dispenser outlet 92 circumscribes void 55. As shown in FIG. 7, first portion 86 is configured to vertically support second portion 88 of dispenser 58, along with compound 52 contained within second portion 88, such that second portion 88 and compound 52 are vertically spaced apart from void 55 and are above structure 54. In this manner, gravity causes compound 52 to flow towards void 55 when valve 62 is moved to allow such flow.

As shown in FIG. 7, dispenser 58 is positioned entirely within volume 120 inside vacuum canister 60 in some examples. Vacuum canister 60 may include canister inlet 82 through which dispenser 58 is inserted (e.g., canister inlet 82 is configured to receive dispenser 58). In such examples, canister inlet 82 is configured to receive compound 52, such as by filling dispenser 58 through canister inlet 82 once dispenser 58 and vacuum canister 60 are positioned with respect to void 55 (e.g., positioned on sandwich panel 56). Additionally or alternatively, in some examples, vacuum canister 60 is placed or positioned on sandwich panel 56, with dispenser 58 passing through canister outlet 84, such as in system 122 where vacuum canister 60 does not include a canister inlet. Lower seal 116 functions to seal vacuum canister 60 to, for example, first outer surface 71 of sandwich panel 56.

In this example, first portion 86 of dispenser 58 includes a first dispenser inlet 90 and a first dispenser outlet 92, while second portion 88 of dispenser 58 includes a second dispenser inlet 90' and a second dispenser outlet 92'. Second portion 88 receives compound 52 through second dispenser inlet 90' and compound exits second portion 88 through second dispenser outlet 92' when valve 62 is moved. Compound 52 then enters first portion 86 through first dispenser inlet 90, and first portion 86 guides compound 52 to void 55 by flowing compound 52 through first dispenser outlet 92 adjacent void 55. Valve 62 is positioned between first portion 86 and second portion 88 of dispenser 58, such as between second dispenser outlet 92' of second portion 88 and first dispenser inlet 90 of first portion 86.

Figure 9:
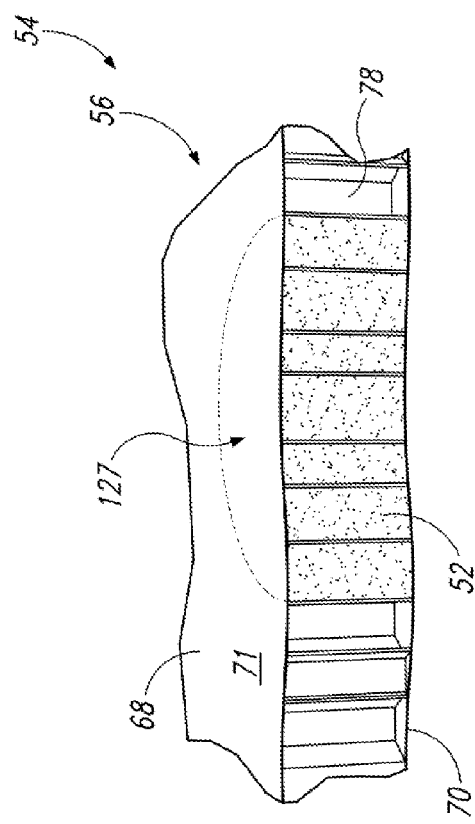
FIG. 9 is a perspective view of a portion of a honeycomb panel that has been repaired using systems and methods according to the present disclosure, showing the improvement in results.
Figure 8:
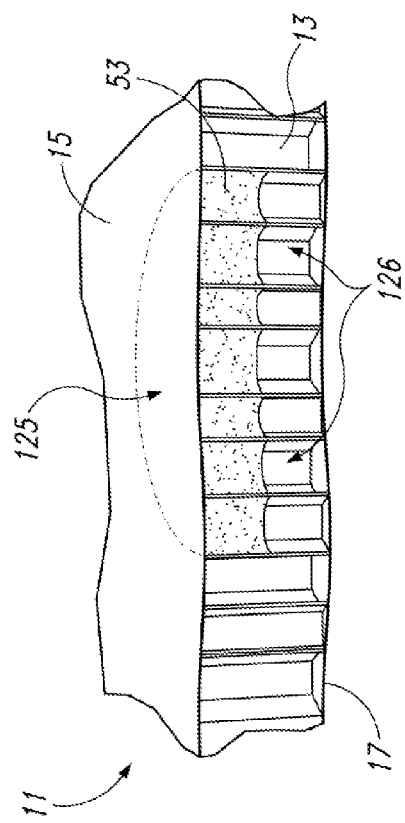
FIG. 8 is a perspective view of a portion of a honeycomb panel that has been repaired using conventional methods, showing air pockets present within the compound that has been deposited in the honeycomb panel.

FIG. 8 illustrates a portion of sandwich panel 11 with a repaired void 125 having been repaired using conventional methods. As shown in FIG. 8, a compound (e.g., compound 52) has been flowed to the void and is positioned within core 13 and adjacent first skin 15 of sandwich panel 11. However, the repaired void 125 includes several pockets of trapped air 126 between compound 53 and sandwich panel 11 (e.g., between compound 53 and second skin 17, as shown). Such air pockets 126 may require a technician to rework the repair, resulting in time-consuming and costly re-work, and/or scrapping the sandwich panel. By contrast, FIG. 9 illustrates a sandwich panel 56 with a repaired void 127 having been repaired using systems 50 and methods according to the present disclosure. As shown in FIG. 9, compound 52 has completely flowed into sandwich panel 56, such that there are no pockets of air trapped between compound 52 and second skin 70 of sandwich panel 56. Presently disclosed systems and methods may eliminate or reduce pockets of air and trapped air in such sandwich panel repairs.

Figure 10:
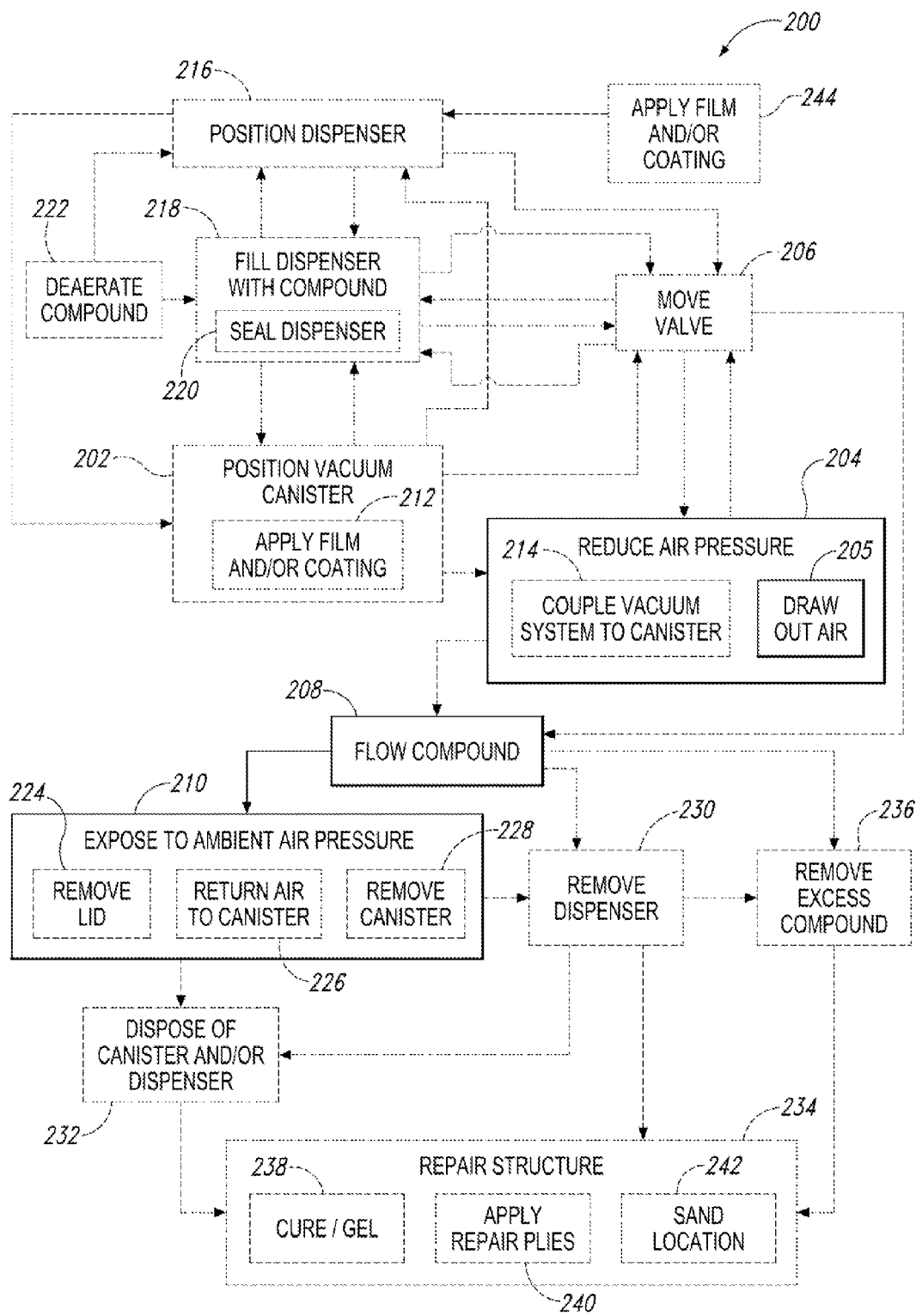
FIG. 10 is a schematic, flow chart diagram, illustrating methods of depositing compounds according to the present disclosure.

FIG. 10 schematically provides a flowchart that represents illustrative, non-exclusive examples of methods according to the present disclosure. In FIG. 10, some steps are illustrated in dashed boxes indicating that such steps may be optional or may correspond to an optional version of a method according to the present disclosure. The methods and steps illustrated in FIG. 10 are not limiting and other methods and steps are within the scope of the present disclosure, including methods having greater than or fewer than the number of steps illustrated, as understood from the discussions herein.

FIG. 10 illustrates methods 200 of depositing a compound (e.g., compound 52) within a structure (e.g., structure 54), such as within a void (e.g., void 55) in a sandwich panel (e.g., sandwich panel 56). Method 200 generally includes positioning a vacuum canister (e.g., vacuum canister 60) with respect to the void at 202, reducing the air pressure within the vacuum canister and the void at 204 by drawing air out of the vacuum canister at 205, and moving a valve (e.g., valve 62) at 206 to allow the compound to flow from a dispenser (e.g., dispenser 58) to the void at 208 while at least a portion of the dispenser, at least a portion of the structure, the compound, and the void are under reduced air pressure. Flowing the compound at 208 may include providing a system (e.g., system 50) configured such that the compound flows from the dispenser, into at least a portion of the vacuum canister, and to the void. For example, the compound may flow at 208 through a dispenser outlet, into a canister inlet, and through a canister outlet to the void. After the compound has flowed into the void at 208, and after waiting sufficient time for the compound to settle into the void, but before the compound cures and hardens, the void and compound are exposed to ambient air pressure at 210, whereupon air pockets trapped between the compound and the sandwich panel skin are compressed.

Positioning the vacuum canister at 202 may include positioning the vacuum canister on the structure such that a canister outlet of the vacuum canister (e.g., canister outlet 84) circumscribes the void. In some methods 200, the vacuum canister is positioned such that it rests on the sandwich panel, such as on a first outer surface (e.g., first outer surface 71) of one skin of the sandwich panel. The canister outlet may thus be configured to allow the compound to flow into the void from the dispenser. In some methods 200, positioning the vacuum canister at 202 may include applying a film, a coating, and/or a seal at 212, such as applying a film, coating, and/or seal between the structure and the vacuum canister. For example, a seal is applied at 212 to create a substantially air-impermeable interface between the vacuum canister and an outer surface of the sandwich panel on which the vacuum canister is positioned. In this manner, drawing air out of the vacuum canister at 205 may result in a reduced air pressure within the vacuum canister, and thereby in the void.

Reducing the air pressure at 204 includes operating a vacuum pump to maintain a pre-determined reduced air pressure within the vacuum canister for a period of time sufficient for the compound to flow from the dispenser into the void, but less than an amount of time sufficient to allow the compound to cure and harden. For example, a vacuum system (e.g., vacuum system 66) is operatively coupled to the vacuum canister at 214, such as via a vacuum port (e.g., vacuum port 64) coupled to the vacuum canister. Reducing the air pressure at 204 is performed until a desired, or target, reduced air pressure is attained within the vacuum canister.

Moving the valve at 206 includes moving the valve from a first position, in which the valve is operable to retain the compound in the dispenser, to a second position, in which the compound flows from the dispenser, through at least a portion of the vacuum canister, and into the void. The moving the valve at 206 to the second position is performed during a period of time in which the target reduced air pressure is maintained within the vacuum canister, such that the void and the compound are under reduced air pressure while the compound flows to the void. In some methods, moving the valve at 206 includes removing the valve from the dispenser outlet entirely. Moving the valve at 206 may be performed manually or automatically, such as in response to reaching a target reduced air pressure within the vacuum canister. Moving the valve at 206 may be performed before or after the positioning the vacuum canister at 202 and/or before or after positioning the dispenser at 216.

Some methods 200 may include positioning the dispenser with respect to the vacuum canister at 216 such that, once the valve is moved at 206, the dispenser is configured to allow the compound to flow from a dispenser outlet of the dispenser (e.g., dispenser outlet 92) into at least a portion of the vacuum canister, such as through a canister inlet of the vacuum canister (e.g., canister inlet 82). In some methods 200 where the vacuum canister and dispenser are formed integrally with each other, positioning the vacuum canister at 202 may include positioning both the vacuum canister and the dispenser simultaneously. In some methods 200, the vacuum canister is positioned on the structure at 202, and then the dispenser is coupled (e.g., removably coupled) to the vacuum canister at 216 and/or positioned such that at least a portion of the dispenser is positioned in and/or on the vacuum canister. In some methods 200, the dispenser is positioned on or with respect to the structure and void at 216, and then the vacuum canister is positioned at 202, such as by placing the vacuum canister over the dispenser (e.g., the vacuum canister is placed on the structure such that the vacuum canister defines a volume between it and the structure, and the dispenser is contained partially or fully within the volume).

In some methods, positioning the dispenser at 216 includes removably coupling the dispenser to the vacuum canister, such as by placing the dispenser on the vacuum canister, snapping the dispenser to the vacuum canister, applying an adhesive to removably couple the dispenser to the vacuum canister, applying a sealant to removably couple the dispenser to the vacuum canister, rotating the dispenser onto the vacuum canister, and/or engaging a first feature of the dispenser with a second feature of the vacuum canister. Additionally or alternatively, the positioning the dispenser at 216 includes positioning a first portion of a dispenser on the structure adjacent and/or surrounding the void, sealing the first portion with respect to the structure, and/or positioning and/or removably coupling a second portion of the dispenser with respect to the first portion.

At least a portion of the dispenser is filled with compound at 218. In some methods 200, the filling the dispenser at 218 includes closing or sealing the dispenser at 220, such as by applying a lid or cover to the dispenser after inserting the compound into the dispenser, and/or closing or sealing a dispenser inlet (e.g., dispenser inlet 90) through which the compound was inserted. Sealing the dispenser at 220 is performed such that the compound is at least substantially prevented from flowing through the dispenser inlet through which it was inserted into the dispenser after the sealing the dispenser at 220. The dispenser is filled with compound at 218 before or after the dispenser is positioned at 216, and/or before or after positioning the vacuum canister at 202. In some methods 200, the moving the valve at 206 includes positioning the valve in the first position (e.g., closed position) prior to at least partially filling the dispenser with compound at 218. In some methods 200, the dispenser is pre-filled with the compound such that the dispenser is filled and sealed before use. In practice, the compound may be deaerated at 222 prior to being inserted into the dispenser (e.g., before the filling at least a portion of the dispenser at 218).

The exposing the void and the compound to the ambient air pressure at 210 is performed before the compound has dried, cured, and/or gelled. In this manner, the compound is free to continue to flow into the void when exposed to the ambient air pressure at 210. The exposing the void and the compound to the ambient air pressure at 210 may include, for example, decoupling the vacuum system from the vacuum port, opening the valve, turning off the vacuum system such that air is no longer drawn from the vacuum canister, removing a lid, cover, and/or seal from the dispenser and/or vacuum canister at 224, using the vacuum system to return air to the vacuum canister at 226, and/or removing the vacuum canister from the structure at 228. In some methods 200, the exposing the void and the compound to the ambient air pressure at 210 includes exposing the void and the compound to ambient air. In some methods 200, the exposing the void and the compound to the ambient air pressure at 210 includes reversing the vacuum pump such that air is pumped back into the vacuum canister at 226, via the vacuum system coupled to the vacuum port.

After the compound flows to the void at 208, the dispenser is removed from the structure at 230 and/or disposed of at 232. In some methods, both the vacuum canister and the dispenser are disposed of at 232. Once the dispenser is removed at 230, other repair steps are performed to repair the void in the structure at 234. For example, excess compound is removed from the area surrounding the void at 236, the compound is allowed to dry, cure, and/or gel at 238, one or more repair plies is applied to the structure at 240, and/or the area is sanded or buffed at 242. In some methods 200, removing the excess compound at 236 is performed before the compound cures or gels at 238. In some methods 200, allowing the compound to cure or gel at 238 may include applying heat to the compound.

Methods 200 may include applying one or more films and/or coatings at 244 to the structure, wherein the one or more films and/or coatings are configured to facilitate a seal between the first skin of the structure and the vacuum canister, and/or to facilitate a seal between the first skin of the structure and the dispenser. For example, a temporary plastic film with a sealant may be applied to one or both side of the sandwich panel to improve the ability of the vacuum system to reduce the air pressure within the vacuum canister and the void.

Methods 200 and systems 50 herein described may be used to deposit any desired compound at any desired location of a structure.

Turning now to FIGS. 11-18, systems and methods for deaerating compounds are illustrated, which may be used in conjunction with the above described systems and methods, separately from the above described systems and methods, and/or may form a portion of any of the above described systems and methods.

FIG. 11 schematically illustrates examples of systems 300 that include a delivery apparatus 302 for deaerating a volume of compound and delivering the deaerated compound to, for example, a storage container 304 and/or to a void in a structure (e.g., void 55 of sandwich panel 56). Delivery apparatus 302 may include vacuum chamber 60, and/or at least a portion of delivery apparatus 302 may be positioned within vacuum chamber 60 during use. Delivery apparatus 302 includes a deaerator head 306 having a deaerator inlet 308 for receiving the volume of compound (e.g., compound 52) and a deaerator outlet 310 opposite deaerator inlet 308. Deaerator outlet 310 may be larger than deaerator inlet 308 as shown. In other examples, deaerator outlet 310 may be smaller than or approximately equal in size to deaerator inlet 308. Delivery apparatus 302 also includes a plurality of apertures 312 (which may also be referred to as holes 312 or perforations 312) positioned with respect to deaerator inlet 308 and deaerator outlet 310 such that respective portions of the volume of compound 52 received into deaerator head 306 through deaerator inlet 308 pass through respective apertures 312 before exiting deaerator head 306, or as exiting deaerator head 306, via deaerator outlet 310. Deaerator head 306 is configured to be positioned at least partially within vacuum chamber 60 during use, such that delivery apparatus 302 is configured to deaerate the volume of compound 52 while deaerator head 306 and apertures 312 are maintained at a reduced air pressure within vacuum chamber 60. In some systems 300, delivery apparatus 302 is additionally configured such that deaerator head 306 receives the volume of compound while deaerator head 306 and apertures 312 are maintained at the reduced air pressure within vacuum chamber 60.

Apertures 312 are sized to increase a ratio of surface area to volume of the volume of compound 52 as the volume of compound 52 passes through the apertures, such that air trapped within compound 52 is forced out and escapes into vacuum chamber 60, thereby deaerating compound 52 as it passes through deaerator head 306. Apertures 312 are sized according to viscosity of compound 52 in some systems 300. For example, the size of apertures 312 may be selected from among a plurality of available sizes, depending on the compound to be deaerated, with larger or smaller sizes being used as desired for a given material.

Apertures 312 may be positioned adjacent, at, between, and/or within deaerator outlet 310 of deaerator head 306. In some examples, apertures 312 define deaerator outlet 310. In some examples, apertures 312 are formed through a plate insert 314 that is coupled to or within deaerator head 306, and/or positioned within deaerator head 306. For example, plate insert 314 including apertures 312 formed there through may be positioned within deaerator head 306 adjacent deaerator outlet 310. Plate insert 314 may be coupled to deaerator head 306 by any suitable means, such as with adhesive, or with a snap or friction fit within deaerator head 306 in some examples. In some examples, plate insert 314 is formed integrally with deaerator head 306 (e.g., plate insert 314 may be a portion of deaerator head 306). Plate insert 314 may be, for example, a metallic or polymeric plate.

Some systems 300 include vacuum pump 66, which may be operatively coupled to vacuum chamber 60 via vacuum port 64, such that vacuum pump 66 is configured to draw air out of vacuum chamber 60 and thereby reduce the air pressure within vacuum chamber 60. Vacuum pump 66 may be configured to reduce the air pressure within vacuum chamber 60 until the air pressure reaches a target reduced air pressure, which may be at least partially determined by the viscosity of compound 52 being deaerated. As with systems 50 described above, vacuum pump 66 may be configured to maintain the target reduced air pressure for a prescribed duration of time (e.g., for a sufficient time such that the volume of compound 52 may be drawn through apertures 312 and deaerator head 306) and/or may be configured to reduce the air pressure within vacuum chamber 60 at a prescribed rate of decrease. Vacuum pump 66 may also be configured to increase the air pressure within vacuum chamber 60, such as to restore the air pressure to ambient air pressure (e.g., after deaeration is at least substantially completed).

In some examples, reducing the air pressure within vacuum chamber 60 while deaerator head 306 and apertures 312 are positioned within vacuum chamber 60 causes the volume of compound 52 to be drawn through deaerator head 306 and apertures 312, towards and through deaerator outlet 310. Additionally or alternatively, the volume of compound 52 may be forced or pushed through deaerator head 306 and apertures 312, such as by pushing compound out of a reservoir 316 and into deaerator head 306, as will be described in more detail below.

Vacuum chamber 60 may include chamber inlet 82 and/or chamber outlet 84 in some systems 300. Chamber inlet 82 is configured to receive at least a portion of deaerator head 306 (and apertures 312) there through such that at least a portion of deaerator head 306 can be positioned within vacuum chamber 60 while deaerating compound 52. In some examples, the entire deaerator head 306 is positioned within vacuum chamber 60 during use. In some examples, deaerator outlet 310 is positioned within vacuum chamber 60 during use, while deaerator inlet 308 is positioned outside vacuum chamber 60 during use. Chamber outlet 84 may be configured to deliver deaerated compound to an external container outside vacuum chamber 60 or to storage container 304 within vacuum chamber 60. Additionally or alternatively, chamber outlet 84 may be configured to allow deaerated compound to exit vacuum chamber 60 for direct placement into void 55 of structure 54. For example, chamber outlet 84 may be positioned such that it surrounds and circumscribes void 55, with the cross-sectional area of chamber outlet 84 being substantially co-planar with first outer surface 71 of sandwich panel 56, in some examples. Chamber outlet 84 is merely an open end of vacuum chamber 60, formed by the perimeter of the walls of vacuum chamber 60, in some examples. In some examples, vacuum chamber 60 need not include chamber outlet 84 (e.g., vacuum chamber 60 may be enclosed opposite chamber inlet 82).

Chamber inlet 82 and/or chamber outlet 84 are sealed during use, such that vacuum pump 66 may reduce the air pressure within vacuum chamber 60. In some examples, chamber outlet 84 may be sealed (e.g., with an outlet seal 116, shown in FIG. 15) to first outer surface 71 of sandwich panel 56, such that chamber outlet 84 circumscribes void 55. Similarly, in some examples, chamber inlet 82 is sealed (e.g., with an inlet seal 114, shown in FIG. 16) to a reservoir 316 for containing the volume of compound 52 prior to deaeration. Such inlet and outlet seals may be configured to create at least substantially air-impermeable seals between vacuum chamber 60 and respective structures, such that the air pressure may be effectively reduced within vacuum chamber 60 by vacuum pump 66. In other examples, chamber inlet 82 and/or chamber outlet 84 may be sealed in other manners or to other structures, or to other parts of vacuum chamber 60 itself. For example, chamber inlet 82 may be sealed via a lid of vacuum chamber 60, after deaerator head 306, apertures 312, reservoir 316, and/or compound 52 are placed within vacuum chamber 60 through chamber inlet 82.

In some examples, reservoir 316 is configured to be selectively coupled to deaerator inlet 308 such that the volume of compound 52 may flow from reservoir 316 into deaerator head 306 via deaerator inlet 308. In one specific example, reservoir 316 is a syringe 318 having a body 320 that terminates at a reservoir outlet 322, and a plunger 324. Plunger 324 may be at least partially inserted within body 320, opposite reservoir outlet 322, and may be configured to push compound 52 within body 320 towards and/or through reservoir outlet 322 when plunger 324 is moved further within body 320, towards reservoir outlet 322. In some examples, reservoir outlet 322 (which in some examples may be a syringe tip) may be positioned within vacuum chamber 60, while an inlet seal 114 is formed between body 320 and chamber inlet 82. Thus, chamber inlet 82 may be sized to be large enough to allow deaerator head 306 to pass there through, while chamber inlet 82 may be too small for all of reservoir 316 to pass there through in some examples (though a portion of reservoir 316, such as reservoir outlet 322, may be small enough to pass through chamber inlet 82).

In some examples, storage container 304 may be dispenser 58 of system 50. In other words, deaerator head 306 and apertures 312 as described in connection with systems 300 may be used with systems 50 in some examples. In other examples, systems 300 may be used in place of systems 50, to perform the same functions (e.g., delivering compound 52 to repair void 55 of sandwich panel 56 while in a reduced air pressure environment), in addition to being used to deaerate compound 52.

Components of systems 300 may be disposable in some examples. For example, deaerator head 306 and/or apertures 312 may be configured for one-time use, and disposed of after deaerating a volume of compound 52. On the other hand, vacuum chamber 60 may be configured to be reusable for deaerating a plurality of volumes of compound 52 and/or repairing a plurality of voids 55 within a plurality of structures 54. Vacuum chamber 60, deaerator head 306, and apertures 312 may be configured to be portable, such that compound 52 may be deaerated and/or voids 55 repaired in various locations, without requiring that the process be performed at or near expensive, non-portable centrifugal vacuum machines. Further, currently disclosed systems 300 are configured to deaerate compound 52 without the use of centrifugal force. Presently disclosed systems 300 may provide for quicker and/or less expensive deaeration of compound 52 (e.g., viscous materials), as compared to prior art methods and devices.

Once deaerated, delivery apparatus 302 may be configured to deliver deaerated compound to structure 54, such as a honeycomb or non-honeycomb sandwich panel. In other examples, delivery apparatus 302 may be configured to deaerate compound for other applications, such as for use as a pre-cured sealant block for a fuel tank. In other words, in some examples, delivery apparatus 302 may both deaerate and deliver deaerated compound to a structure or container, while in other examples, delivery apparatus 302 may be combined with a different system (e.g., system 50) for depositing the deaerated compound into a void or container. In some examples, systems 300 include a plurality of delivery apparatuses 302, for a plurality of different deaeration operations. Some such systems 300 include a plurality of different sizes of deaerator heads 306 and/or a plurality of different sizes of apertures 312, such as to accommodate different volumes of compound 52 and/or to deaerate a plurality of different compounds having different viscosities more effectively.

FIG. 12 shows an example of deaerator head 306 having plate insert 314 (shown separately in FIG. 13) and apertures 312 formed therein positioned at deaerator outlet 310. As shown in FIG. 12, deaerator outlet 310 is larger than (e.g., has a greater cross-sectional area than) deaerator inlet 308 in this example. Compound 52 enters deaerator head 306 through deaerator inlet 308, passes through apertures 312, and exits deaerator head 306 through deaerator outlet 310.

FIG. 12 illustrates a plurality of streams 326 of compound 52 resulting from the compound being forced through apertures 312. Deaerator head 306 is shown apart from vacuum chamber 60 in FIG. 12, for clarity, but in use, streams 326 of compound 52 would be formed inside vacuum chamber 60 and flow into a void (e.g., void 55) of a structure (e.g., sandwich panel 56), into a container (e.g., storage container 304), or into some other receptacle (e.g., dispenser 58). Forcing compound 52 through apertures 312 of deaerator head 306 increases the proportion of surface area to volume of compound 52 and allows encapsulated or trapped air within compound 52 to exit compound 52 into the surrounding air within vacuum chamber 60.

Figure 14:
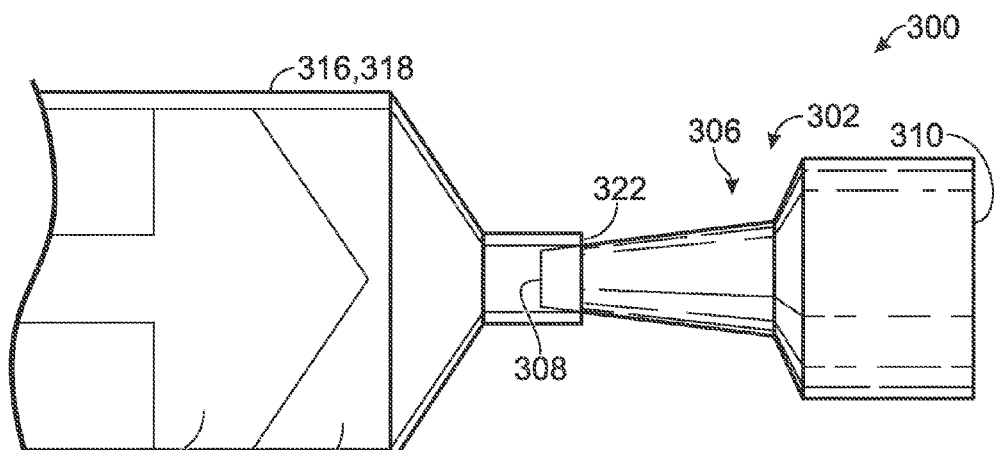
FIG. 14 is an elevation view of an example of a delivery apparatus coupled to a reservoir, according to the present disclosure.

Deaerator inlet 308 may be coupled to reservoir 316, as shown in FIG. 14. In the example of FIG. 14, reservoir 316 is a syringe 318 for holding the volume of compound 52 prior to deaeration, and is configured to deliver the compound to deaerator head 306 via deaerator inlet 308. For example, deaerator inlet 308 is coupled to reservoir outlet 322 (e.g., a syringe tip), with the compound being stored inside body 320 of reservoir 316, between plunger 324 and reservoir outlet 322. Moving plunger 324 towards reservoir outlet 322 urges or aids compound 52 within reservoir 316 towards and through reservoir outlet 322, such that it enters deaerator head 306 (e.g., deaerator inlet 308). In other examples, different types of reservoirs 316 with different connections to deaerator head 306 may be used.

Figure 15:
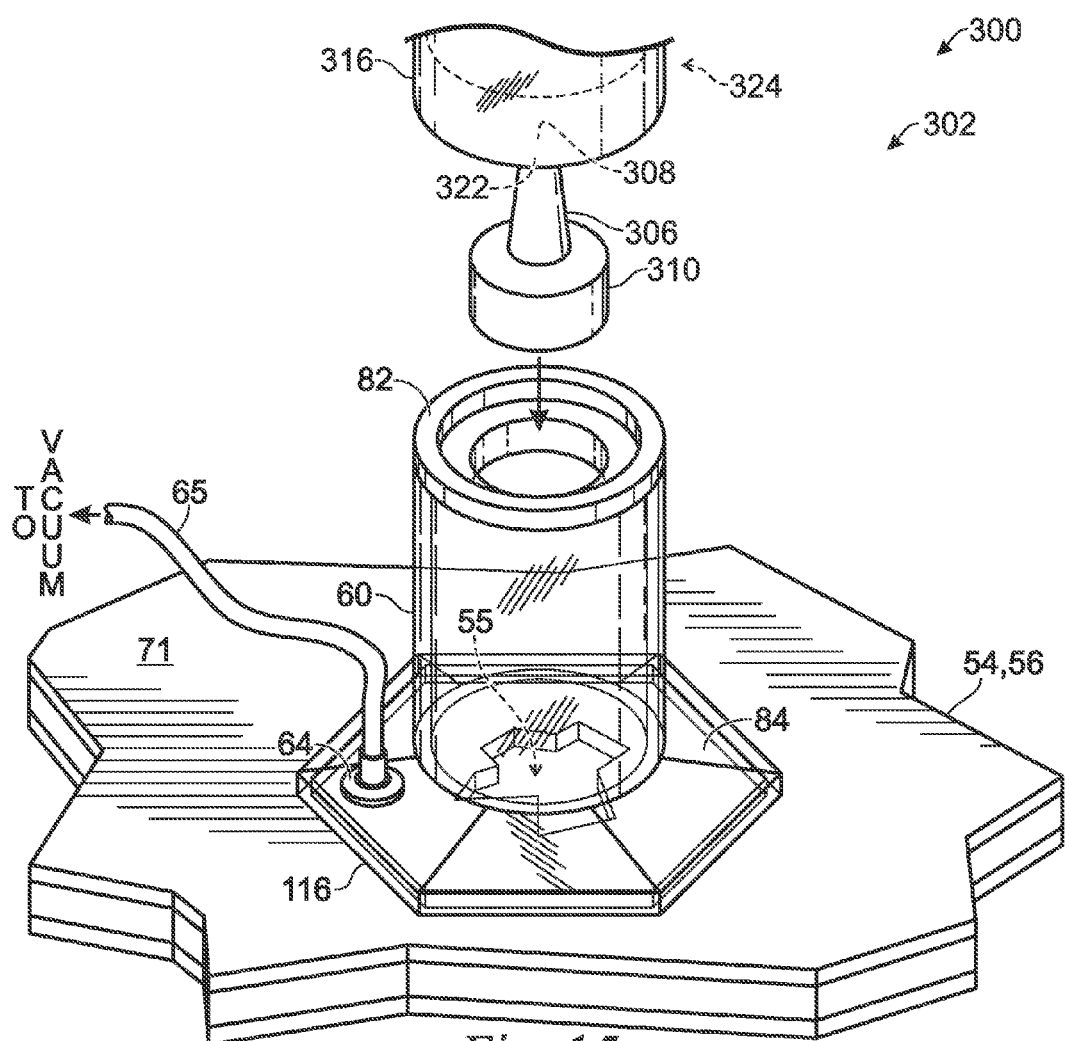
FIG. 15 is a perspective view of an example of a system for deaerating a compound, according to the present disclosure, with a deaerator head in the process of being inserted into a vacuum chamber.
Figure 16:
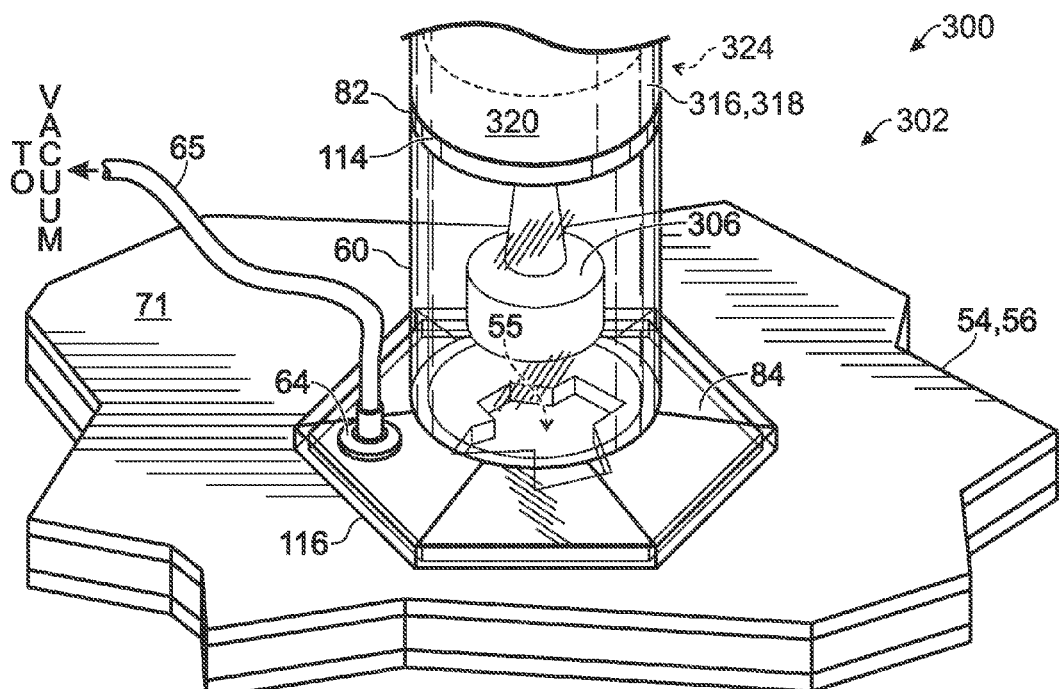
FIG. 16 is a perspective view of the system of FIG. 15, with the deaerator head being fully inserted into the vacuum chamber.

FIG. 15 illustrates an example of deaerator head 306 being inserted through chamber inlet 82 of vacuum chamber 60, while FIG. 16 illustrates deaerator head 306 of delivery apparatus 302 fully positioned within vacuum chamber 60, with inlet seal 114 formed between chamber inlet 82 and reservoir 316 (e.g., syringe 318). As shown in FIGS. 15-16, in use, vacuum chamber 60 may be positioned on and sealed with respect to structure 54. For example, vacuum chamber 60 is positioned such that chamber outlet 84 faces first outer surface 71 of sandwich panel 56, with chamber outlet 84 circumscribing void 55. Outlet seal 116 is formed between chamber outlet 84 and structure 54, once so positioned. In this example, reservoir outlet 322 of reservoir 316 (containing compound 52 prior to deaeration) is coupled to deaerator inlet 308 of deaerator head 306, and then deaerator head 306 may be passed through chamber inlet 82, such that deaerator head 306 is positioned inside vacuum chamber 60, with deaerator outlet 310 facing chamber outlet 84 and first outer surface 71 of sandwich panel 56.

As shown in FIGS. 15-16, chamber inlet 82 and deaerator head 306 may be sized with respect to one another such that deaerator head 306 can pass through chamber inlet 82, while reservoir 316 may be sized relative to chamber inlet 82 such that only a portion of (or none of) reservoir 316 passes through chamber inlet 82 in some examples. In this example, reservoir outlet 322 may extend through chamber inlet 82, while body 320 of reservoir 316 is too large to pass through chamber inlet 82. As shown in FIG. 16, when deaerator head 306 and reservoir 316 are inserted into vacuum chamber 60 to the extent allowed by the relative sizes of chamber inlet 82 and reservoir 316, inlet seal 114 may be formed between reservoir 316 (e.g., body 320 of reservoir 316) and chamber inlet 82.

Once delivery apparatus 302 is sealed at chamber inlet 82 and/or chamber outlet 84, a vacuum pump (e.g., vacuum pump 66) operatively coupled to vacuum chamber 60 via vacuum tube 65 may reduce the air pressure within vacuum chamber 60. This reduction in air pressure within vacuum chamber 60 as compared to the non-vacuum environment outside vacuum chamber 60 may pull compound 52 from reservoir 316 and into deaerator head 306. Additionally or alternatively, plunger 324 (or another component of reservoir 316) may be used to push or force compound 52 from reservoir 316 (e.g., through reservoir outlet 322) and into deaerator head 306 positioned within vacuum chamber 60. In the example shown in FIG. 16, delivery apparatus 302 is configured such that deaerated compound exiting deaerator head 306 within vacuum chamber 60 may flow directly towards void 55 and thus delivery apparatus 302 is configured to both deaerate compound 52 and deposit deaerated compound 52 into void 55 to repair structure 54, all while in a reduced air pressure environment. Thus, delivery apparatus 302 may be configured to both remove trapped air from compound 52, and to help reduce the occurrence of air being trapped within void 55 below compound 52, once compound 52 is deposited.

Figure 17:
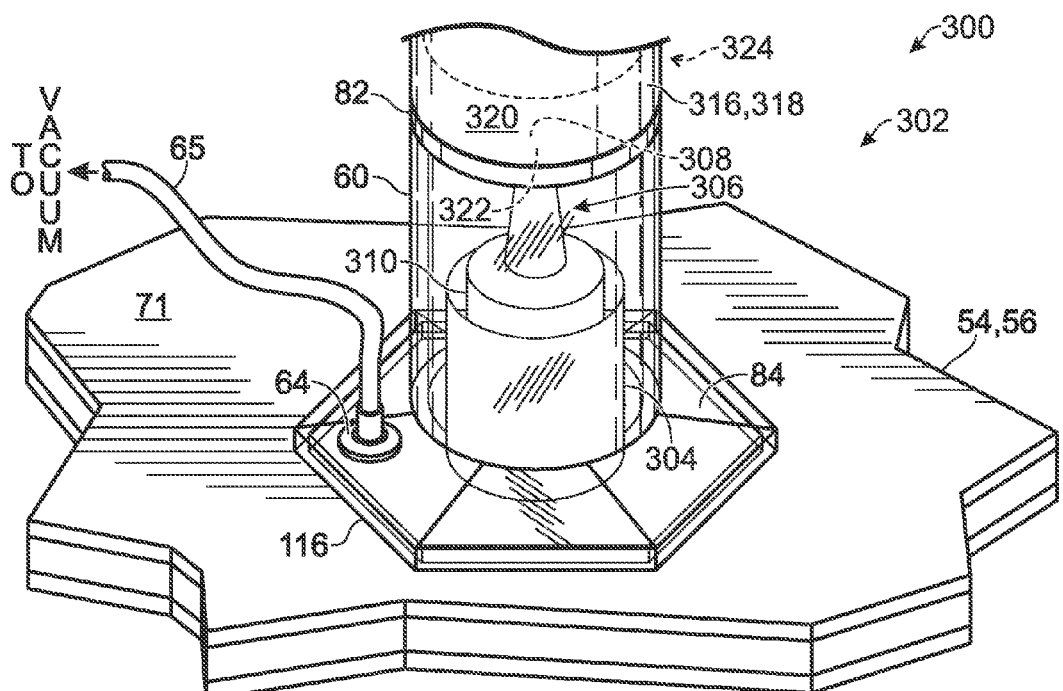
FIG. 17 is a perspective view of another system for deaerating a compound, according to the present disclosure.

In some examples, as shown in FIG. 17, delivery apparatus 302 is configured to deliver deaerated compound 52 from deaerator head 306 into a container positioned within vacuum chamber 60 (e.g., storage container 304). Deaerated compound 52 may then be collected and stored in storage container 304, transferred to another location, and/or additional compound 52 may be deaerated by delivery apparatus 302 and delivered to storage container 304.

Figure 18:
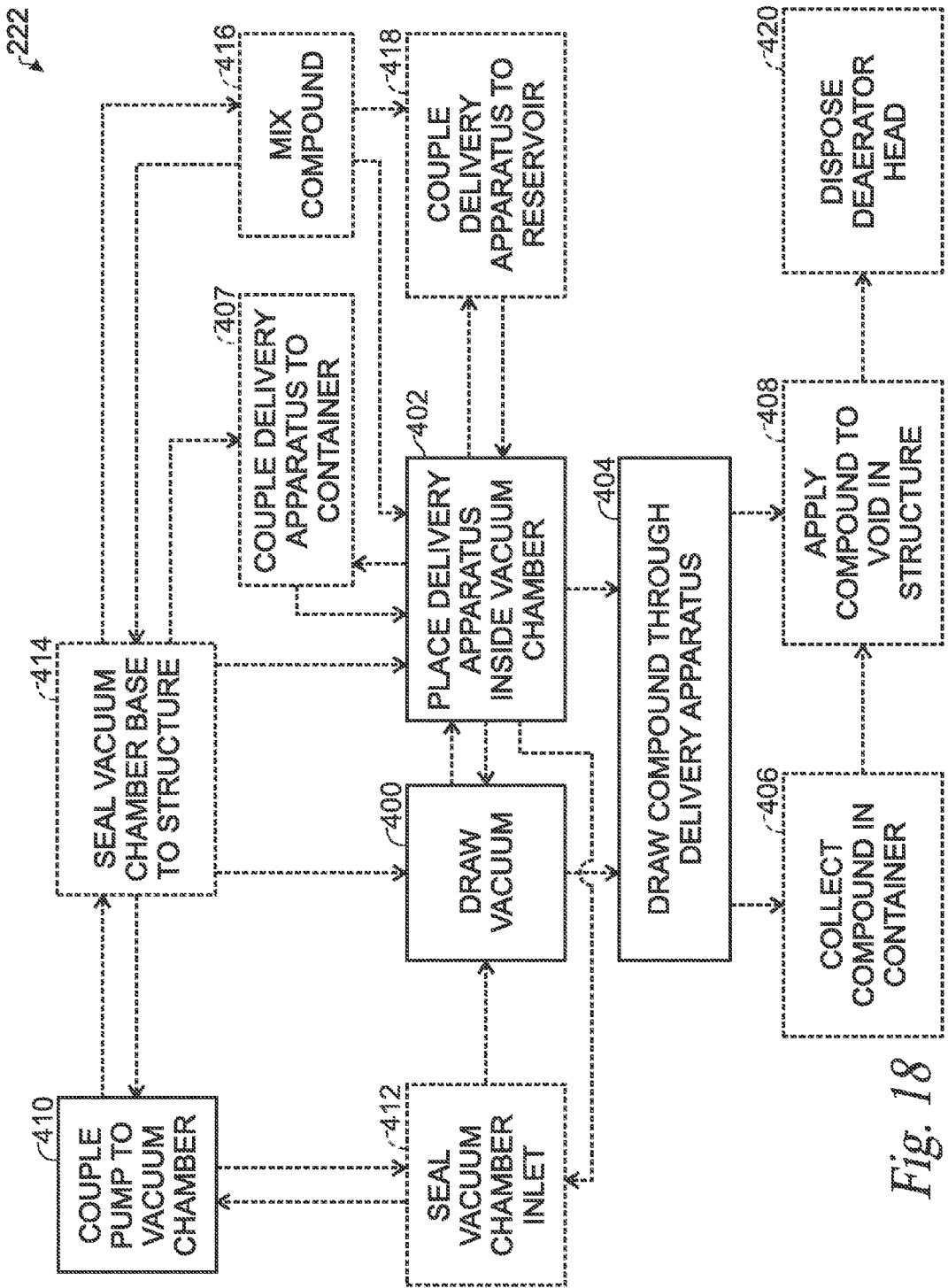
FIG. 18 is a schematic, flow chart diagram, illustrating methods of deaerating compounds according to the present disclosure.

FIG. 18 schematically provides a flowchart that represents illustrative, non-exclusive examples of methods according to the present disclosure. As with FIG. 10, in FIG. 18, some steps are illustrated in dashed boxes indicating that such steps may be optional or may correspond to an optional version of a method according to the present disclosure. The methods and steps illustrated in FIG. 18 are not limiting and other methods and steps are within the scope of the present disclosure, including methods having greater than or fewer than the number of steps illustrated, as understood from the discussions herein.

FIG. 18 illustrates methods 222 of deaerating compounds (e.g., compound 52), such as viscous materials, according to the present disclosure. Methods 222 of deaerating compounds may be performed as stand-alone methods in some examples, or may be combined with other methods, such as indicated in FIG. 10. Methods 222 of deaerating a compound generally include drawing a vacuum within a vacuum chamber at 400 (e.g., reducing the air pressure within vacuum chamber 60 with a vacuum pump), placing at least a portion of a delivery apparatus (e.g., delivery apparatus 302) inside the vacuum chamber at 402, and drawing, or flowing, the compound through the delivery apparatus (e.g., through deaerator head 306 and apertures 312) at 404 to deaerate the compound. Flowing the volume of compound through the delivery apparatus at 404 may include forcing the volume of compound from a reservoir containing the volume of compound prior to deaeration (e.g., reservoir 316) towards a deaerator inlet of the deaerator head (e.g., deaerator inlet 308), such as by pushing a plunger of the reservoir (e.g., plunger 324) towards a reservoir outlet (e.g., reservoir outlet 322) and the deaerator inlet. Additionally or alternatively, flowing the compound through the delivery apparatus at 404 may result from reducing the air pressure within the vacuum chamber, due to the pressure difference between the vacuum environment within the vacuum chamber and the non-vacuum environment in which the volume of compound is positioned prior to deaeration. The vacuum pump may be configured to continuously remove air from the vacuum chamber, such that encapsulated air released from the compound during deaeration into the vacuum chamber is removed from the vacuum chamber.

After drawing the compound through the delivery apparatus at 404, the deaerated compound may be collected in a container (e.g., storage container 304) at 406 and/or applied or deposited in a void of a structure (e.g., within void 55 of sandwich panel 56) at 408, such as to repair a damaged portion of the structure using the deaerated compound. Such drawing the compound through the delivery apparatus at 404, collecting the compound in a container at 406, and/or applying the deaerated compound to a void in a structure at 408 may be performed while the compound and delivery apparatus (or at least a portion thereof) are in a reduced air pressure environment within the vacuum chamber. In other words, drawing the vacuum at 400 is generally performed before drawing the compound through the delivery apparatus at 404. In methods 222 including collecting the compound in a container at 406, the delivery apparatus may be coupled to said container at 407 in some examples, prior to the drawing the compound through the delivery apparatus at 404. In some methods 222, collecting the compound in a container at 406 includes collecting the deaerated compound into a container positioned within the vacuum chamber, which may or may not be coupled to the delivery apparatus. In these methods, placing at least a portion of the delivery apparatus within the vacuum chamber at 402 may include positioning a deaerator outlet (e.g., deaerator outlet 310) relative to the container such that the deaerated compound exiting the deaerator outlet flows into the container. Similarly, in methods 222 including applying the deaerated compound to a void in a structure at 408, placing at least a portion of the delivery apparatus within the vacuum chamber at 402 may include positioning the deaerator outlet relative to the void such that the deaerated compound exiting the deaerator outlet flows into the void.

In some methods, deaerating the compound at 222 includes coupling the vacuum chamber to a vacuum pump (e.g., vacuum pump 66, via vacuum tube 65 and vacuum port 64) at 410. Additionally or alternatively, methods 222 may include sealing the vacuum chamber, such as sealing a vacuum chamber inlet (e.g., sealing chamber inlet 82 with inlet seal 114) at 412. For example, sealing the vacuum chamber inlet at 412 may include sealing the chamber inlet with respect to a reservoir containing the compound to be deaerated (e.g., reservoir 316). Similarly, some methods 222 includes sealing a vacuum chamber outlet (e.g., sealing chamber outlet 84 with outlet seal 116) at 414, such by sealing the chamber outlet to the structure on which the vacuum chamber in positioned (e.g., sealing the chamber outlet to first outer surface 71 of sandwich panel 56).

In some methods 222, placing at least a portion of the delivery apparatus inside the vacuum chamber at 402 may include selecting a respective deaerator head from a plurality of deaerator heads, and/or selecting a respective plate insert (e.g., plate insert 314) from a plurality of plate inserts having different respective aperture sizes, based on a viscosity, the volume to be deaerated, and/or other characteristic(s) or properties of the volume of compound. Additionally or alternatively, placing at least a portion of the delivery apparatus inside the vacuum chamber at 402 may include coupling a respective plate insert to a respective deaerator head, such as coupling the plate insert at a location adjacent the deaerator outlet of the deaerator head.

Some methods 222 include mixing the compound at 416, which may introduce entrapped air. The compound may be mixed in a reservoir, or simply transferred to the delivery apparatus in a reservoir in methods where mixing is not performed. Some methods 222 include coupling a reservoir containing the compound prior to deaeration to the delivery apparatus at 418. For example, a reservoir outlet (e.g., reservoir outlet 322) may be coupled to an inlet of the deaerator head (e.g., deaerator inlet 308) such that the compound may flow from the reservoir into the deaerator head. In some methods, coupling the delivery apparatus to the reservoir at 418 is performed before the placing the delivery apparatus (e.g., the deaerator head) inside the vacuum chamber at 402. Some methods 222 include disposing the deaerator head and apertures at 420, after deaerating the volume of compound, such as when the deaerator head and apertures are configured for one-time use. Other aspects of the delivery apparatus may be configured to be reusable, such as the vacuum chamber.

In this manner, presently described methods and devices may provide for deaeration of a viscous material while in a reduced air pressure environment, and subsequent deposition of the deaerated compound in a container or void, while still in the reduced air pressure environment.

In examples where one or more components are computer-controlled, such examples may include any suitable device or devices that are configured to perform the functions of a controller. For example, the controller may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

Illustrative, non-exclusive examples of inventive subject matter according to the present disclosure are described in the following enumerated paragraphs:

A1. A system for depositing a compound into a void within a structure, the system comprising:

a dispenser for holding the compound to be dispensed into the void; and a valve operable in a first position to retain the compound in the dispenser, and operable in a second position to enable the compound to flow into the void while an air pressure within the void is being maintained at a reduced air pressure.

A1.1. The system of paragraph A1, further comprising a vacuum canister comprising a vacuum port configured to enable a vacuum system to reduce an/the air pressure within the vacuum canister and the void to a/the reduced air pressure.

A1.2. The system of paragraph A1.1, wherein the vacuum canister comprises:

a canister inlet configured to allow the compound to flow from the dispenser into at least a portion of the vacuum canister; and a canister outlet configured to allow the compound to flow into the void, wherein the vacuum canister is configured to be selectively positioned with respect to the void such that the canister outlet circumscribes the void.

A1.3. The system of any of paragraphs A1-A1.2, wherein the dispenser comprises:

a first portion configured to be positioned with respect to the void such that the compound may flow through the first portion to the void where the compound is to be deposited; and a second portion, wherein the second portion is configured to hold a volume of the compound and deliver the volume of compound to the first portion.

A1.4. The system of paragraph A1.3, wherein the first portion is configured to be positioned on the structure, around the void.

A1.5. The system of any of paragraphs A1-A1.4, wherein the dispenser comprises a dispenser inlet to receive the compound.

A1.6. The system of any of paragraphs A1-A1.5, wherein the dispenser comprises at least one dispenser outlet configured to channel the compound toward the void.

A1.7. The system of paragraph A1.6, wherein the at least one dispenser outlet is configured to channel the compound into a/the vacuum canister.

A1.8. The system of paragraph A1.6 or A1.7, wherein the at least one dispenser outlet is configured to channel the compound from a/the second portion of the dispenser into a/the first portion of the dispenser.

A1.9. The system of any of paragraphs A1.6-A1.8, wherein the at least one dispenser outlet is configured to channel the compound from a/the first portion of the dispenser, through at least a portion of a/the vacuum canister.

A1.10. The system of any of paragraphs A1.6-A1.9, wherein the at least one dispenser outlet is configured to receive the compound into the dispenser.

A1.11. The system of any of paragraphs A1.6-A1.9, wherein the at least one dispenser outlet is different from a/the dispenser inlet configured to receive the compound into the dispenser.

A1.12. The system of any of paragraphs A1-A1.11, wherein the valve is positioned between a/the second portion of the dispenser and a/the first portion of the dispenser.

A1.13. The system of any of paragraphs A1-A1.12, wherein the valve is positioned between a/the first portion of the dispenser and a/the vacuum canister.

A1.14. The system of any of paragraphs A1-A1.13, wherein the valve is positioned between the dispenser and a/the vacuum canister.

A1.15. The system of any of paragraphs A1-A1.14, wherein the dispenser and a/the vacuum canister are formed unitarily with each other.

A1.16. The system of any of paragraphs A1-A1.14, wherein the dispenser is formed separately from a/the vacuum canister.

A1.17. The system of any of paragraphs A1-A1.16, wherein the valve is coupled to the dispenser.

A1.18. The system of any of paragraphs A1-A1.17, wherein the vacuum port is coupled to a/the vacuum canister.

A1.19. The system of any of paragraphs A1-A1.18, wherein an inlet diameter of a/the dispenser inlet is larger than an outlet diameter of a/the dispenser outlet.

A1.20. The system of any of paragraphs A1-A1.19, wherein a first diameter of a/the canister inlet is smaller than a second diameter of a/the canister outlet.

A1.21. The system of any of paragraphs A1-A1.20 wherein the dispenser is configured to be disposable after a single use.

A1.22. The system of any of paragraphs A1-A1.21 wherein the system comprises a/the vacuum canister that is configured to be disposable after a single use.

A1.23. The system of any of paragraphs A1-A1.22, wherein the dispenser is configured such that a/the first portion is selectively removable from a/the second portion.

A1.24. The system of any of paragraphs A1-A1.23, wherein a/the canister inlet is configured to receive at least a portion of the dispenser.

A1.25. The system of any of paragraphs A1-A1.24, wherein a/the canister inlet is configured to receive the compound from the dispenser.

A1.26. The system of any of paragraphs A1-A1.25, wherein the valve is selectively movable such that the compound flows through a/the dispenser outlet when the valve is moved to the second position.

A1.27. The system of any of paragraphs A1-A1.26, wherein a/the vacuum canister is configured to be positioned on the structure.

A1.28. The system of any of paragraphs A1-A1.27, wherein at least a portion of a/the vacuum canister surrounds at least a portion of the dispenser.

A1.29. The system of any of paragraphs A1-A1.28, wherein a/the vacuum canister is configured such that the dispenser is contained within a volume defined between the vacuum canister and the structure.

A1.30. The system of any of paragraphs A1-A1.29, further comprising the vacuum system operatively coupled to a/the vacuum canister, the vacuum system being configured to draw air out of the vacuum canister.

A1.31. The system of any of paragraphs A1-A1.30, wherein the valve is configured to at least substantially prevent flow of the compound through a/the dispenser outlet when the valve is in the first position.

A1.32. The system of any of paragraphs A1-A1.31, wherein the second position of the valve is remote from the dispenser such that the valve is configured to be selectively removable from a/the dispenser outlet, thereby permitting flow of the compound through the dispenser outlet.

A2. The system of any of paragraphs A1-A1.32, wherein a/the first portion of the dispenser is configured to selectively and removably receive at least some of a/the second portion of the dispenser.

A2.1. The system of any of paragraphs A1-A2, wherein a/the vacuum canister is configured to selectively and removably receive at least some of the dispenser.

A2.2. The system of any of paragraphs A1-A2.1, wherein a/the canister inlet of a/the vacuum canister is configured to selectively and removably receive at least some of the dispenser.

A3. The system of any of paragraphs A1-A2.2, wherein a/the second portion of the dispenser is configured to be removably placed on a/the first portion of the dispenser.

A4. The system of any of paragraphs A1-A3, wherein a/the second portion of the dispenser is configured to be removably coupled to a/the first portion of the dispenser.

A5. The system of any of paragraphs A1-A2.2, wherein a/the first portion of the dispenser and a/the second portion of the dispenser are integrally formed.

A6. The system of any of paragraphs A1-A5, wherein the valve is selectively replaceable on a/the dispenser outlet.

A7. The system of any of paragraphs A1-A6, wherein the valve comprises one or more of a tape, an adhesive, a hinge, a sliding structure, a cover, a pivoting structure, and a snap-fit structure.

A8. The system of any of paragraphs A1-A7, wherein the valve is configured to be moved to the second position remotely.

A9. The system of any of paragraphs A1-A7, wherein the valve is configured to be manually moved to the second position.

A9.1. The system of any of paragraphs A1-A9, wherein the valve is configured to be automatically moved to the second position once a target reduced air pressure is reached inside a/the vacuum canister.

A9.2. The system of any of paragraphs A1-A9.1, wherein the valve is configured to be selectively moved to the second position when a/the vacuum canister is positioned over the dispenser.

A9.3. The system of any of paragraphs A1-A9.1, wherein the valve is configured to be selectively moved to the second position when a/the second portion of the dispenser is placed on a/the first portion of the dispenser.

A9.4. The system of any of paragraphs A1-A9.1, wherein the valve is configured to be selectively moved to the second position when the dispenser is positioned with respect to a/the vacuum canister.

A9.5. The system of any of paragraphs A1-A9.4, wherein the valve is configured to be selectively moved to the second position by an actuator.

A10. The system of any of paragraphs A1-A9.5, wherein the dispenser is configured to contain a/the volume of compound that is sufficient to repair the void.

A11. The system of any of paragraphs A1-A10, wherein the vacuum system is configured to reduce the air pressure within a/the vacuum canister until the air pressure within the vacuum canister reaches a target reduced air pressure.

A12. The system of paragraph A11, wherein the target reduced air pressure is at least partially determined by the viscosity of the compound.

A13. The system of any of paragraphs A1-A12, wherein the vacuum system is configured to reduce the air pressure within a/the vacuum canister at a prescribed rate of decrease.

A14. The system of any of paragraphs A1-A13, wherein the vacuum system is configured to maintain a/the target reduced air pressure for a prescribed duration of time.

A15. The system of paragraph A14, wherein the prescribed duration of time is sufficient for the compound to flow into the void from the dispenser, but not so long that the compound cures and hardens.

A16. The system of any of paragraphs A1-A15, wherein the vacuum system is configured to restore ambient air pressure within a/the vacuum canister at a prescribed rate.

A17. The system of any of paragraphs A1-A16, wherein the vacuum system is manually controlled.

A18. The system of any of paragraphs A1-A16, wherein the vacuum system is computer-controlled.

A19. The system of any of paragraphs A1-A18, wherein a/the vacuum canister comprises a seal configured to create an at least substantially air-impermeable seal between the structure and the vacuum canister.

A20. The system of paragraph A19, wherein the seal comprises a gasket, a sealant tape, an adhesive, a sealant compound, and/or a film.

A21. The system of any of paragraphs A1-A20, wherein a/the first portion of the dispenser comprises a cylinder.

A22. The system of any of paragraphs A1-A21, wherein a/the first portion of the dispenser comprises a first opening configured to be positioned adjacent the structure.

A23. The system of paragraph A22, wherein the first portion of the dispenser is configured to be positioned with respect to the structure such that the first opening faces the structure.

A24. The system of paragraph A22 or A23, wherein the first portion is configured to be removably coupled to the structure, adjacent the first opening.

A25. The system of paragraph A24, wherein the first portion is configured to be coupled to the structure with one or more of a gasket, a seal, a fitting, a film, a coating, an adhesive, a sealant, and a tape.

A26. The system of any of paragraphs A22-A25, wherein the first opening is approximately the same size and shape of the void.

A27. The system of any of paragraphs A1-A26, wherein a/the canister outlet is approximately the same size and shape of the void.

A28. The system of any of paragraphs A22-A26, wherein the first portion comprises a second opening opposite the first opening, and wherein a/the second portion of the dispenser is configured to be positioned adjacent the second opening of the first portion.

A28.1. The system of paragraph A28, wherein the second portion is configured to be positioned such that a/the dispenser outlet is adjacent the second opening of the first portion of the dispenser.

A29. The system of paragraph A28 or A28.1, wherein the dispenser is configured to guide the compound from the second portion, through the dispenser outlet of the second portion, into the first portion, through the first opening of the first portion, and into or onto the structure.

A30. The system of any of paragraphs A1-A29, wherein a/the first portion of the dispenser is a hollow, thin-walled first tool portion.

A31. The system of any of paragraphs A1-A30, wherein a/the first portion of the dispenser is configured to vertically support a/the second portion of the dispenser, above the structure.

A32. The system of any of paragraphs A1-A31, wherein a/the first portion of the dispenser is sized to accommodate the volume of compound.

A33. The system of any of paragraphs A1-A32, wherein a/the second portion of the dispenser comprises a funnel.

A34. The system of any of paragraphs A1-A33, wherein a/the second portion of the dispenser is sized to hold a sufficient volume of compound to repair the void.

A35. The system of any of paragraphs A1-A34, wherein the valve is configured to restrict the flow of the compound through a/the dispenser outlet while a/the second portion of the dispenser is filled with the compound and the valve is in the first position.

A36. The system of any of paragraphs A1-A35, wherein the system is configured to deposit a potting compound within the void.

A37. The system of any of paragraphs A1-A36, wherein the structure comprises a honeycomb panel, and wherein the system is configured to deposit the compound within the honeycomb panel.

A38. The system of any of paragraphs A1-A37, wherein the system is configured to repair a/the honeycomb panel.

A39. The system of any of paragraphs A1-A38, wherein the system is configured to insert a/the potting compound into a/the honeycomb panel such that the potting compound is significantly devoid of pores and entrapped air.

A40. The system of any of paragraphs A1-A39, wherein the system is configured to insert a/the potting compound into a/the honeycomb panel such that the potting compound has a porosity of less than 10%, less than 5%, and/or less than 1% after curing.

A41. The system of any of paragraphs A1-A40, further comprising the structure.

A42. The system of any of paragraphs A1-A41, wherein the structure comprises a/the honeycomb panel having a first skin, a second skin, and a core extending there between, wherein the dispenser is configured to be placed on the first skin such that the first tool portion is substantially sealed to the first skin, and wherein the system is configured to deposit the compound into a portion of the core.

A43. The system of any of paragraphs A1-A42, wherein the structure comprises a hollow-core structural material.

A44. The system of any of paragraphs A1-A43, wherein the structure comprises a damaged portion to be repaired using the compound.

A45. The system of any of paragraphs A1-A44, further comprising the compound.

A46. The system of any of paragraphs A1-A45, wherein the compound comprises a potting compound.

A47. The system of any of paragraphs A1-A46, wherein the compound is configured to repair a/the honeycomb panel, a/the hollow-core panel, and/or another structural material.

A48. The system of any of paragraphs A1-A47, wherein the compound has a viscosity such that it is configured to flow through the outlet of the second tool portion.

A49. The system of any of paragraphs A1-A48, wherein the compound is configured to flow into the structure.

A50. The system of any of paragraphs A1-A49, wherein the compound is configured to flow freely into one or more interior spaces of the structure, under ambient pressure.

A51. The system of any of paragraphs A1-A50, wherein the dispenser comprises a removable lid configured to selectively cover a/the dispenser inlet, such that the dispenser inlet may receive compound into the dispenser when the removable lid is removed, and such that the removable lid is configured to prevent the compound from flowing through the dispenser inlet when the removable lid is covering the dispenser inlet.

A52. The system of any of paragraphs A1-A51, wherein the system comprises a dispenser seal configured to selectively seal a/the dispenser inlet, such that the dispenser inlet may receive compound into the dispenser before the dispenser inlet is sealed with the dispenser seal, and such that the dispenser seal is configured to prevent the compound from flowing through the dispenser inlet once the dispenser inlet is sealed with the dispenser seal.

A53. The system of any of paragraphs A1-A52, wherein the dispenser is pre-filled with the compound.

B1. A delivery apparatus for deaerating a volume of compound, the delivery apparatus comprising:

a deaerator head having a deaerator inlet for receiving the volume of compound and a deaerator outlet opposite the deaerator inlet, the deaerator outlet being larger than the deaerator inlet; and a plurality of apertures positioned with respect to the deaerator inlet and the deaerator outlet such that respective portions of the volume of compound received into the deaerator head through the deaerator inlet pass through respective apertures of the plurality of apertures before exiting the deaerator head or as exiting the deaerator head through the deaerator outlet, wherein the delivery apparatus is configured to deaerate the volume of compound while the deaerator head and the plurality of apertures are maintained at a reduced air pressure.

B1.1. The delivery apparatus of paragraph B1, wherein the deaerator head is configured to receive the volume of compound while the deaerator head and the plurality of apertures are maintained at the reduced air pressure.

B2. The delivery apparatus of paragraph B1 or B1.1, wherein the plurality of apertures are sized to increase a ratio of surface area to volume of the volume of compound as the volume of compound passes through the plurality of apertures.

B2.1. The delivery apparatus of any of paragraphs B1-B2.1, wherein the plurality of apertures are sized based on a viscosity of the volume of compound.

B3. The delivery apparatus of any of paragraphs B1-B2, wherein the plurality of apertures are positioned adjacent, at, between, and/or within the deaerator outlet of the deaerator head.

B3.1. The delivery apparatus of any of paragraphs B1-B3, wherein the plurality of apertures define the deaerator outlet of the deaerator head.

B4. The delivery apparatus of any of paragraphs B1-B3.1, wherein the delivery apparatus is configured to receive the volume of compound from a non-vacuum environment and deliver the volume of compound to a vacuum environment, wherein the vacuum environment has a lower air pressure relative to the non-vacuum environment.

B5. The delivery apparatus of any of paragraphs B1-B4, wherein the plurality of apertures are formed through a plate insert coupled to or within the deaerator head.

B5.1. The delivery apparatus of any of paragraphs B1-B5, wherein the plurality of apertures are formed through a/the plate insert positioned within the deaerator head.

B6. The delivery apparatus of paragraph B5 or B5.1, wherein the plate insert comprises a metallic plate.

B7. The delivery apparatus of paragraph B5 or B5.1, wherein the plate insert comprises a polymeric plate.

B8. The delivery apparatus of any of paragraphs B5-B7, wherein the plate insert is adhered to or within the deaerator head.

B9. The delivery apparatus of any of paragraphs B5-B7, wherein the plate insert is formed integrally with the deaerator head.

B10. The delivery apparatus of any of paragraphs B5-B9, wherein the plate insert has a snap-fit with respect to the deaerator head.

B11. The delivery apparatus of any of paragraphs B1-B10, wherein the deaerator head and the plurality of apertures are configured to be positioned within a vacuum chamber while the volume of compound is deaerated, wherein the vacuum chamber is configured to be operatively coupled to a vacuum pump via a vacuum port, wherein the vacuum pump is configured to draw air out of the vacuum chamber, thereby reducing the air pressure within the vacuum chamber to the reduced air pressure.

B11.1. The delivery apparatus of paragraph B11, wherein the delivery apparatus is configured such that reducing the air pressure within the vacuum chamber while the deaerator head and the plurality of apertures are positioned within the vacuum chamber causes the volume of compound to be drawn through the deaerator head and the plurality of apertures, towards and through the deaerator outlet.

B12. The delivery apparatus of paragraph B11 or B11.1, wherein the delivery apparatus further comprises the vacuum chamber.

B13. The delivery apparatus of any of paragraphs B11-B12, wherein the delivery apparatus further comprises the vacuum pump.

B14. The delivery apparatus of any of paragraphs B11-B13, wherein the vacuum pump is configured to reduce the air pressure within the vacuum chamber until the air pressure within the vacuum chamber reaches a target reduced air pressure.

B15. The delivery apparatus of paragraph B14, wherein the target reduced air pressure is at least partially determined by a/the viscosity of the compound.

B16. The delivery apparatus of any of paragraphs B11-B15, wherein the vacuum pump is configured to reduce the air pressure within the vacuum chamber at a prescribed rate of decrease.

B17. The delivery apparatus of any of paragraphs B11-B16, wherein the vacuum pump is configured to maintain a/the target reduced air pressure for a prescribed duration of time.

B18. The delivery apparatus of paragraph B17, wherein the prescribed duration of time is sufficient for the volume of compound to be drawn through the plurality of apertures of the delivery apparatus, thereby deaerating the volume of compound.

B19. The delivery apparatus of any of paragraphs B11-B18, wherein the vacuum pump is configured to restore ambient air pressure within the vacuum chamber at a prescribed rate.

B20. The delivery apparatus of any of paragraphs B11-B19, wherein the vacuum pump is manually controlled.

B21. The delivery apparatus of any of paragraphs B11-B20, wherein the vacuum pump is computer-controlled.

B22. The delivery apparatus of any of paragraphs B11-B21, wherein the vacuum chamber comprises a chamber inlet configured to receive the deaerator head and the plurality of apertures there through.

B23. The delivery apparatus of any of paragraphs B11-B22, wherein the vacuum chamber comprises an inlet seal configured to create an at least substantially air-impermeable seal between the vacuum chamber and a reservoir containing the volume of compound prior to deaeration.

B23.1. The delivery apparatus of paragraph B23, further comprising the reservoir.

B23.2. The delivery apparatus of paragraph B23.1, wherein the reservoir is configured to be selectively coupled to the deaerator inlet such that the volume of compound may flow from the reservoir into the deaerator head via the deaerator inlet.

B23.3. The delivery apparatus of paragraph B23.1 or B23.2, wherein the reservoir comprises a syringe having a body that terminates at a reservoir outlet, and a plunger configured to be at least partially inserted within the body opposite the reservoir outlet, wherein the plunger is configured to push compound within the body towards and/or through the reservoir outlet, when the plunger is moved further within the body towards the reservoir outlet.

B23.4. The delivery apparatus of any of paragraphs B23-B23.3, wherein the inlet seal is configured to create an at least substantially air-impermeable seal between a/the chamber inlet and the reservoir containing the volume of compound prior to deaeration.

B23.5. The delivery apparatus of any of paragraphs B23-B23.4, wherein the inlet seal is configured to create an at least substantially air-impermeable seal between a/the chamber inlet and a/the body of the reservoir containing the volume of compound prior to deaeration.

B23.6. The delivery apparatus of any of paragraphs B22-B23.5, wherein a/the chamber inlet is sized to allow passage of the deaerator head and the plurality of apertures there through, while preventing passage of a/the reservoir containing the volume of compound prior to deaeration.

B23.7. The delivery apparatus of any of paragraphs B22-B23.6, wherein the chamber inlet is sized to allow passage there through of the deaerator head, the plurality of apertures, and a/the reservoir outlet of a/the reservoir containing the volume of compound prior to deaeration, while preventing passage of a/the body of the reservoir there through.

B23.8. The delivery apparatus of any of paragraphs B23-B23.7, wherein a/the reservoir outlet of the reservoir comprises a syringe tip.

B24. The delivery apparatus of any of paragraphs B11-B23.8, wherein the vacuum chamber comprises an outlet seal configured to create an at least substantially air-impermeable seal between the vacuum chamber and a structure on which the vacuum chamber is positioned.

B25. The delivery apparatus of any of paragraphs B23-24, wherein a/the inlet seal comprises a gasket, a sealant tape, an adhesive, a sealant compound, and/or a film.

B26. The delivery apparatus of paragraph B24, wherein the outlet seal comprises a gasket, a sealant tape, an adhesive, a sealant compound, and/or a film.

B27. The delivery apparatus of any of paragraphs B11-B26, wherein the vacuum chamber comprises a chamber outlet, wherein the vacuum chamber is configured to be selectively positioned with respect to a void formed in a/the structure such that the chamber outlet circumscribes the void, and wherein the delivery apparatus is configured to deliver the volume of compound to the void after deaeration.

B27.1. The delivery apparatus of paragraph B27 and B24, wherein the outlet seal is configured to create an at least substantially air-impermeable seal between the chamber outlet and the structure on which the vacuum chamber is positioned.

B28. The delivery apparatus of any of paragraphs B11-B27.1, further comprising a storage container positioned within the vacuum chamber, wherein the delivery apparatus is configured to deliver the volume of compound to the storage container after deaeration.

B28.1. The delivery apparatus of paragraph B28, wherein the storage container is the dispenser of the system of any of paragraphs A1-A53.

B29. The delivery apparatus of any of paragraphs B11-B28.1, wherein the vacuum chamber and vacuum pump are configured to remove encapsulated air from the volume of compound as the volume of compound is drawn through the deaerator head and the plurality of apertures, into the vacuum chamber.

B30. The delivery apparatus of any of paragraphs B11-B29, wherein the vacuum chamber is configured to be reusable.

B31. The delivery apparatus of any of paragraphs B1-B30, wherein the deaerator head and the plurality of apertures are configured to be disposable.

B32. The delivery apparatus of any of paragraphs B1-B31, further comprising a vacuum tube configured to couple a/the vacuum chamber to a/the vacuum pump via a/the vacuum port of the vacuum chamber.

B33. The delivery apparatus of any of paragraphs B1-B32, wherein the delivery apparatus is configured to deaerate the volume of compound without using centrifugal force.

B34. The delivery apparatus of any of paragraphs B1-B33, wherein the delivery apparatus is configured to be portable.

B35. The delivery apparatus of any of paragraphs B1-B34, wherein the delivery apparatus is configured to deaerate and deliver potting compound to a honeycomb panel.

B36. The delivery apparatus of any of paragraphs B1-B35, wherein the delivery apparatus is configured to deaerate and deliver potting compound to a structure other than a/the honeycomb panel.

B37. The delivery apparatus of any of paragraphs B1-B36, wherein the delivery apparatus is configured to deaerate the volume of compound for use as a pre-cured sealant block for a fuel tank.

B38. The delivery apparatus of any of paragraphs B1-B37, wherein the deaerator head and the plurality of apertures are configured to be combined with a mechanism that is configured to deposit the volume of compound on a/the structure, after the volume of compound is deaerated by the delivery apparatus.

B39. The delivery apparatus of any of paragraphs B1-B38, wherein the delivery apparatus is further configured to deliver the volume of compound to a/the void in a/the structure after the volume of compound is deaerated by the delivery apparatus.

B40. The delivery apparatus of any of paragraphs B1-B39, in combination with the system of any of paragraphs A1-A53.

B41. The delivery apparatus and system of paragraph B40, wherein a/the vacuum canister of the system is a/the vacuum chamber of the delivery apparatus.

C1. A system for deaerating and depositing a compound, the system comprising:
 the system for depositing a compound into a void within a structure of any of paragraphs A1-A53; and
 the delivery apparatus for de-aerating a volume of compound of any of paragraphs B1-B41.

C2. The system of paragraph C1, comprising a plurality of delivery apparatuses of any of paragraphs B1-B41, wherein the plurality of delivery apparatuses includes a plurality of different sizes of deaerator heads and/or a plurality of different sizes of apertures.

C3. The system of paragraph C1 or C2, wherein the deaerator head and the plurality of apertures of the delivery apparatus are positioned within a/the vacuum canister of the system for deaerating and depositing a compound into a void, while the volume of compound is deaerated.

C4. The system of any of paragraphs C1-C3, wherein a/the vacuum canister of the system is a/the vacuum chamber of the delivery apparatus.

D1. A method of de-aerating a volume of compound, the method comprising:
 reducing an air pressure within a vacuum chamber in which the deaerator head and the plurality of apertures of the delivery apparatus of any of paragraphs B1-B41 are positioned;
 flowing the volume of compound through the deaerator head and the plurality of apertures while the deaerator head and the plurality of apertures are maintained at a reduced air pressure within the vacuum chamber, thereby deaerating the volume of compound.

D2. The method of paragraph D1, wherein the flowing the volume of compound comprises delivering the volume of compound from a non-vacuum environment outside the vacuum chamber to a vacuum environment inside the vacuum chamber.

D3. The method of any of paragraphs D1-D2, wherein the plurality of apertures are sized to increase a surface area to volume ratio of the volume of compound as the volume of compound flows through the plurality of apertures.

D4. The method of any of paragraphs D1-D3, wherein the flowing the volume of compound through the deaerator head and the plurality of apertures comprises forcing the volume of compound from a/the reservoir containing the volume of compound prior to deaeration towards the deaerator inlet of the deaerator head.

D5. The method of paragraph D4, wherein the forcing the volume of compound towards the deaerator inlet comprises pushing a/the plunger of a/the syringe containing the volume of compound prior to deaeration.

D6. The method of any of paragraphs D4-D5, wherein the forcing the volume of compound towards the deaerator inlet comprises drawing the volume of compound into the vacuum chamber by reducing the air pressure within the vacuum chamber, thereby creating a pressure difference between a/the vacuum environment within the vacuum chamber and a/the non-vacuum environment in which the volume of compound is positioned prior to deaeration.

D7. The method of any of paragraphs D1-D6, wherein the flowing the volume of compound through the deaerator head and the plurality of apertures comprises removing encapsulated air from the compound, into the vacuum chamber.

D8. The method of any of paragraphs D1-D7, further comprising collecting deaerated compound from the delivery apparatus in a/the storage container positioned in the vacuum chamber.

D8.1. The method of paragraph D8, wherein the storage container is the dispenser of the system of any of paragraphs A1-A53.

D9. The method of paragraph D8 or D8.1, further comprising positioning the deaerator outlet of the deaerator head relative to the storage container such that deaerated compound exiting the deaerator outlet flows into the storage container.

D10. The method of any of paragraphs D1-D9, further comprising delivering deaerated compound to a/the void in a/the structure.

D11. The method of paragraph D10, wherein the vacuum chamber is positioned on the structure.

D12. The method of paragraph D10 or D11, wherein the structure is a/the honeycomb panel.

D13. The method of any of paragraphs D10-D12, further comprising positioning the deaerator outlet of the deaerator head relative to the void such that deaerated compound exiting the deaerator outlet flows into the void.

D14. The method of any of paragraphs D1-D13, further comprising selecting a respective deaerator head from a plurality of deaerator heads, based on a viscosity of the volume of compound.

D15. The method of any of paragraphs D1-D14, further comprising selecting a respective plate insert from a plurality of plate inserts, wherein the plurality of apertures comprises a respective plurality of apertures formed through each respective plate insert, and wherein the selecting the respective plate insert is performed based on a size of the respective plurality of apertures and a/the viscosity of the volume of compound.

D16. The method of any of paragraphs D1-D15, wherein the volume of compound comprises a volume of potting compound.

D17. The method of any of paragraphs D1-D16, wherein the volume of compound comprises a volume of viscous material.

D18. The method of any of paragraphs D1-D17, wherein the volume of compound comprises a volume of a two-part resin.

D19. The method of any of paragraphs D1-D18, further comprising forming the volume of compound by mixing two materials together.

D20. The method of any of paragraphs D1-D19, further comprising coupling a/the plate insert comprising the plurality of apertures to the deaerator head.

D21. The method of paragraph D20, wherein the coupling the plate insert to the deaerator head comprises coupling the plate insert adjacent the deaerator outlet of the deaerator head.

D21. The method of any of paragraphs D1-D20, further comprising operatively coupling a/the vacuum pump to the vacuum chamber, the vacuum pump being configured to draw air out of the vacuum chamber, thereby reducing the air pressure within the vacuum chamber.

D22. The method of any of paragraphs D1-D21, further comprising forming an/the outlet seal between a/the chamber outlet of the vacuum chamber and a/the structure on which the vacuum chamber is positioned.

D23. The method of any of paragraphs D1-D22, further comprising coupling a/the reservoir containing the volume of compound prior to deaeration to the deaerator head.

D24. The method of paragraph D23, wherein the coupling the reservoir to the deaerator head comprises coupling the reservoir to the deaerator inlet of the deaerator head such that the volume of compound is configured to flow from the reservoir into the deaerator head.

D25. The method of any of paragraphs D1-D24, further comprising positioning the deaerator head and the plurality of apertures inside the vacuum chamber.

D26. The method of paragraph D25, wherein the positioning the deaerator head inside the vacuum chamber comprises moving the deaerator head and the plurality of apertures through a/the chamber inlet of the vacuum chamber.

D27. The method of any of paragraphs D1-D26, further comprising forming an/the inlet seal between a/the chamber inlet of the vacuum chamber and a/the reservoir containing the volume of compound prior to deaeration.

D28. The method of any of paragraphs D1-D27, further comprising disposing of the deaerator head and the plurality of apertures after performing the flowing the volume of compound through the plurality of apertures to deaerate the volume of compound.

E1. A method for depositing a compound into a void within a structure, the method comprising:

positioning a vacuum canister with respect to the void such that a canister outlet of the vacuum canister circumscribes the void, the canister outlet being configured to allow the compound to flow into the void from a dispenser configured to hold the compound;

using a vacuum system to draw air out of the vacuum canister and the void to maintain a target reduced air pressure within the vacuum canister, wherein the vacuum system is operably coupled to the vacuum canister via a vacuum port; and moving a valve from a first position, in which the valve is operable to retain the compound in the dispenser, to a second position, in which the compound flows from the dispenser, through at least a portion of the vacuum canister, and into the void, wherein the moving the valve to the second position is performed during a period of time in which the target reduced air pressure is maintained, and wherein the period of time is sufficient to allow the compound to flow into the void, and not so long that the compound cures and hardens.

E1.1. The method of paragraph E1, further comprising positioning the dispenser with respect to the vacuum canister such that the dispenser is configured to allow the compound to flow from a dispenser outlet of the dispenser into the vacuum canister once the moving the valve to the second position is performed.

E1.2. The method of paragraph E1 or E1.1, further comprising filling at least a portion of the dispenser with the compound.

E1.3. The method of paragraph E1.2, wherein the filling at least a portion of the dispenser with the compound is performed prior to the positioning the vacuum canister with respect to the void.

E1.4. The method of any of paragraphs E1.2-E1.3, further comprising positioning the valve in the first position prior to the filling at least the portion of the dispenser with the compound.

E1.5. The method of any of paragraphs E1.2-E1.4, further comprising closing a dispenser inlet through which the portion of the dispenser is filled, such that the compound is substantially prevented from flowing through the dispenser inlet after the closing the dispenser inlet.

E1.6. The method of any of paragraphs E1-E1.5, further comprising exposing the compound and the void to ambient air pressure after the period of time during which the target reduced air pressure is maintained, wherein the exposing the compound and the void to ambient air pressure is performed before the compound has cured.

E1.7. The method of paragraph E1.6, wherein the exposing the compound and the void to ambient air pressure comprises releasing the vacuum.

E1.8. The method of paragraph E1.6 or E1.7, wherein the exposing the compound and the void to ambient air pressure comprises removing the vacuum canister such that the void is exposed to ambient air.

E1.9. The method of paragraph E1.8, wherein the removing the vacuum canister is performed before the compound has gelled.

E1.10. The method of any of paragraphs E1.6-E1.9, wherein the exposing the compound and the void to the ambient air pressure comprises reversing the vacuum pump such that air is pumped into the vacuum canister, thereby increasing the air pressure from the target reduced air pressure.

E1.11. The method of any of paragraphs E1.6-E1.10, wherein the exposing the compound and the void to ambient air pressure comprises removing a removable lid from the dispenser, thereby exposing the void and the compound to ambient air.

E1.12. The method of any of paragraphs E1-E1.11, further comprising disposing of the dispenser after the compound flows into the void.

E1.13. The method of any of paragraphs E1-E1.12, further comprising positioning the dispenser with respect to the void.

E1.14. The method of any of paragraphs E1-E1.13, further comprising placing the vacuum canister on the structure such that the vacuum canister defines a volume between it and the structure, wherein the dispenser is contained within the volume.

E1.15. The method of any of paragraphs E1-E1.14, further comprising disposing of the vacuum canister after the compound flows into the void.

E2. The method of any of paragraphs E1-E1.15, comprising flowing the compound through the dispenser while the dispenser is under vacuum.

E3. The method of any of paragraphs E1-E2, comprising flowing the compound through the dispenser while at least a portion of the structure is under reduced air pressure.

E4. The method of any of paragraphs E1-E3, wherein the structure comprises a first skin, a second skin, and a core extending there between, wherein the method comprises flowing the compound to at least a portion of the core of the structure, while the void is under reduced air pressure.

E5. The method of any of paragraphs E1-E4, wherein the method comprises flowing the compound through the dispenser while the compound is under reduced air pressure.

E6. The method of any of paragraphs E1-E5, further comprising operatively coupling the vacuum system to the vacuum canister.

E7. The method of any of paragraphs E1-E6, wherein the using the vacuum system to draw air out of the vacuum canister comprises reducing the air pressure in the dispenser, the compound, and at least a portion of the structure.

E8. The method of any of paragraphs E1-E7, wherein the positioning the vacuum canister, using the vacuum system to draw air out of the vacuum canister, and/or the moving the valve are performed using the system of any of paragraphs A1-A53.

E9. The method of any of paragraphs E1-E8, comprising positioning a/the first portion of the dispenser on the structure, adjacent the void.

E10. The method of any of paragraphs E1-E9, comprising positioning a/the first portion of the dispenser on the structure such that it surrounds the void.

E11. The method of any of paragraphs E1-E10, wherein a portion of the core is exposed through the void.

E12. The method of any of paragraphs E1-E11, wherein the void corresponds to a damaged portion of the structure.

E13. The method of any of paragraphs E1-E12, comprising sealing a/the first portion of the dispenser with respect to the structure.

E14. The method of paragraph E13, wherein the sealing the first portion with respect to the structure comprises sealing the first portion with respect to a/the first surface of the structure, such that the first portion surrounds the void.

E15. The method of paragraph E13 or E14, wherein the sealing the first portion with respect to the structure comprises placing a sealant tape, a gasket, and/or a fitting at an intersection of the first portion and the structure, such that a removable, substantially air-impermeable seal is formed at the intersection of the first portion and the structure.

E16. The method of any of paragraphs E1-E15, comprising positioning a/the second portion of the dispenser with respect to a/the first portion.

E17. The method of any of paragraphs E1-E16, comprising removably coupling a/the second portion of the dispenser to a/the first portion of the dispenser.

E18. The method of paragraph E17, wherein the removably coupling the second portion to the first portion comprises one or more of placing the second portion on the first portion, snapping the second portion to the first portion, applying an adhesive to removably couple the second portion to the first portion, applying a sealant to removably couple the second portion to the first portion, rotating the second portion onto the first portion, and engaging a first feature of the first portion with a second feature of the second portion.

E18.1. The method of any of paragraphs E1-E18, comprising removably coupling the dispenser to the vacuum canister.

E18.2. The method of paragraph E18.1, wherein the removably coupling the dispenser to the vacuum canister comprises one or more of placing the dispenser on the vacuum canister, snapping the dispenser to the vacuum canister, applying an adhesive to removably couple the dispenser to the vacuum canister, applying a sealant to removably couple the dispenser to the vacuum canister, rotating the dispenser onto the vacuum canister, and engaging a first feature of the dispenser with a second feature of the vacuum canister.

E19. The method of any of paragraphs E1-E18.2, comprising placing a volume of the compound in a/the second portion of the dispenser.

E20. The method of paragraph E19, wherein, when depending from paragraph E17, the placing the volume of compound in the second portion of the dispenser is performed before the removably coupling the second portion to the first portion of the dispenser.

E21. The method of paragraph E19, wherein, when depending from paragraph E17, the placing the volume of compound in the second portion of the dispenser is performed after the removably coupling the second portion to the first portion of the dispenser.

E22. The method of any of paragraphs E1-E21, further comprising moving the valve with respect to the dispenser, thereby exposing at least a portion of a/the dispenser outlet.

E23. The method of paragraph E22, wherein the moving the valve comprises removing the valve from the dispenser.

E23.1. The method of paragraph E22 or E23, wherein the moving the valve comprises removing the valve from a/the second portion of the dispenser.

E24. The method of any of paragraphs E22-E23.1, wherein the moving the valve is performed before the positioning the vacuum canister.

E25. The method of any of paragraphs E22-E23.1, wherein the moving the valve is performed after the positioning the vacuum canister.

E26. The method of any of paragraphs E22-E25, wherein, when depending from any of paragraphs E16-E18, the moving the valve is performed after the positioning the second portion of the dispenser with respect to the first portion of the dispenser.

E27. The method of any of paragraphs E22-E25, wherein, when depending from any of paragraphs E16-E18, the moving the valve is performed before the positioning the second portion of the dispenser with respect to the first portion of the dispenser.

E28. The method of any of paragraphs E22-E27, wherein, when depending from any of paragraphs E16-E18, the positioning the second portion of the dispenser with respect to the first portion of the dispenser automatically causes the moving the valve.

E29. The method of any of paragraphs E1-E28, further comprising removing the vacuum canister, wherein the removing the vacuum canister is performed after the moving the valve to the second position and flowing the compound into the void.

E30. The method of any of paragraphs E1-E29, further comprising removing the dispenser from the structure, wherein the removing the dispenser is performed after the moving the valve to the second position and flowing the compound into the void.

E31. The method of any of paragraphs E1-E30, further comprising allowing the compound to cure, and applying one or more repair plies to the structure, wherein the repair plies are configured to repair the void in the structure.

E32. The method of any of paragraphs E1-E31, comprising flowing the compound to the void simultaneously with the applying the vacuum.

E33. The method of any of paragraphs E1-E32, wherein the method comprises using the system of any of paragraphs A1-A53.

E34. The method of any of paragraphs E1-E33, wherein the using the vacuum system to reduce the air pressure is performed until a desired reduced air pressure is attained within the vacuum canister.

E35. The method of paragraph E34, wherein the using the vacuum system to reduce the air pressure is performed such that the target reduced air pressure is maintained within the vacuum canister for a prescribed period of time.

E36. The method of any of paragraphs E1-E35, further comprising returning air to the vacuum canister to restore ambient air pressure within the vacuum canister.

E37. The method of paragraph E36, wherein the returning air to the vacuum canister is performed at a prescribed rate.

E38. The method of any of paragraphs E36-E37, wherein the returning air to the vacuum canister is performed until the air pressure within the vacuum canister is approximately equal to ambient.

E39. The method of any of paragraphs E36-E38, further comprising removing the vacuum canister, wherein the removing the vacuum canister is performed after the returning air to the vacuum canister.

E40. The method of any of paragraphs E36-E39, further comprising removing the dispenser from the structure, wherein the removing the dispenser is performed after the returning air to the vacuum canister.

E41. The method of any of paragraphs E1-E40, wherein the method comprises repairing a portion of a honeycomb panel.

E42. The method of any of paragraphs E1-E41, wherein the structure comprises a/the honeycomb panel having a/the first skin, a/the second skin, and a/the core extending there between, wherein the method further comprises removing one or more plies of material to expose a portion of the core, thereby forming a/the void through the first skin and a portion of the core.

E43. The method of any of paragraphs E1-E42, further comprising placing one or more plies of repair material over a/the void in the structure, wherein the placing the one or more plies of repair material is performed after the moving the valve to the second position to flow the compound into the void and after the compound has cured.

E44. The method of any of paragraphs E1-E43, further comprising applying one or more films to a/the first surface of the structure, wherein the one or more films are configured to facilitate a/the seal between a/the first skin of the structure and the vacuum canister, and/or to facilitate a/the seal between the first skin of the structure and the dispenser and/or between the first skin of the structure and the vacuum canister.

E45. The method of any of paragraphs E1-E44, further comprising applying one or more coatings to a/the first surface of the structure, wherein the one or more coatings are configured to facilitate a/the seal between a/the first skin of the structure and the vacuum canister, and/or to facilitate a/the seal between the first skin of the structure and the dispenser and/or between the first skin of the structure and the vacuum canister.

E46. The method of any of paragraphs E1-E45, further comprising removing excess compound from an area adjacent the void, after the compound gels.

E47. The method of any of paragraphs E1-E46, further comprising removing excess compound from an/the area adjacent the void, after the compound cures.

E48. The method of any of paragraphs E1-E47, further comprising sanding an/the area adjacent the void, wherein the sanding is performed after flowing the compound into the void.

E49. The method of any of paragraphs E1-E48, further comprising applying heat to the compound to cure the compound.

E50. The method of any of paragraphs E1-E49, further comprising deaerating the compound.

E51. The method of paragraph E50, wherein the deaerating the compound comprises performing the method of any of paragraphs D1-D28.

E52. The method of paragraph E50 or E51, wherein when depending from paragraph E1.2, the deaerating the compound is performed prior to the filling at least the portion of the dispenser with the compound.

E53. The method of any of paragraphs E50-E52, wherein the deaerating the compound is performed before placing a/the volume of compound in the dispenser.

E54. The method of any of paragraphs E50-E53, wherein the deaerating the compound comprises placing the compound under a vacuum.

E55. The method of any of paragraphs E50-E54, wherein the deaerating the compound is performed before the moving the valve to the second position to flow the compound to the void.

F1. The use of the system of any of paragraphs A1-A53 to apply the compound to the void in the structure.

F2. The use according to paragraph F1, wherein the compound comprises a potting compound.

F3. The use according to paragraph F1 or F2, wherein the structure comprises a honeycomb panel.

F4. The use according to any of paragraphs F1-F3, to repair a/the damaged portion of the structure.

G1. The use of the delivery apparatus of any of paragraphs B1-1341 to deaerate a compound.

H1. The use of the system of any of paragraphs C1-C4 to deaerate a compound and deposit the compound into the void in the structure.

I1. A method, comprising:
using the system of any of paragraphs A1-A53 to deposit the compound at a desired location of the structure;
removing the system from the structure; and
curing the compound.

I2. The method of paragraph I1, further comprising any of the steps of paragraphs E1-E55.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of systems and apparatuses and steps of methods disclosed herein are not required to all systems, apparatuses, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed system, apparatus, or method. Accordingly, such inventive subject matter is not required to be associated with the specific systems, apparatuses, and methods that are expressly disclosed herein, and such inventive subject matter may find utility in systems, apparatuses, and/or methods that are not expressly disclosed herein.

The invention claimed is:

1. A delivery apparatus for deaerating a volume of compound, the delivery apparatus comprising:
a deaerator head comprising a deaerator inlet and a deaerator outlet, wherein the deaerator inlet is configured for receiving the volume of compound, wherein the deaerator outlet is opposite the deaerator inlet, and wherein the deaerator outlet is larger than the deaerator inlet;
a plurality of apertures positioned with respect to the deaerator inlet and the deaerator outlet such that respective portions of the volume of compound received into the deaerator head through the deaerator inlet pass through respective apertures of the plurality of apertures before exiting the deaerator head through the deaerator outlet;
a vacuum chamber comprising a chamber inlet configured to receive the deaerator head and the plurality of apertures therethrough, wherein the deaerator head and the plurality of apertures are configured to be positioned within the vacuum chamber while the volume of compound is deaerated, wherein the delivery apparatus is configured to deaerate the volume of compound while the deaerator head and the plurality of apertures are maintained at a reduced air pressure in the vacuum chamber, and wherein the plurality of apertures are sized to increase a ratio of surface area to volume of the volume of compound as the volume of compound passes through the plurality of apertures; and
a reservoir body that contains the volume of compound prior to deaeration, wherein the reservoir body comprises a reservoir outlet, wherein the reservoir outlet is configured to be selectively coupled to the deaerator inlet such that the volume of compound may flow from the reservoir body into the deaerator head via the reservoir outlet and the deaerator inlet, wherein the chamber inlet of the vacuum chamber is sized to allow passage of the deaerator head, the plurality of apertures, and the reservoir outlet therethrough, while preventing passage of the reservoir body into the vacuum chamber through the chamber inlet.

2. The delivery apparatus according to claim 1, wherein the plurality of apertures are formed through a plate insert positioned within the deaerator head.

3. The delivery apparatus according to claim 1, wherein the vacuum chamber is configured to be operatively coupled to a vacuum pump via a vacuum port, wherein the vacuum pump is configured to draw air out of the vacuum chamber, thereby reducing the air pressure within the vacuum chamber to the reduced air pressure.

4. The delivery apparatus according to claim 1, wherein the delivery apparatus is configured such that reducing the air pressure within the vacuum chamber while the deaerator head and the plurality of apertures are positioned within the vacuum chamber causes the volume of compound to be drawn through the deaerator head and the plurality of apertures, towards and through the deaerator outlet.

5. The delivery apparatus according to claim 1, least substantially air-impermeable seal between the chamber inlet and the reservoir body.

6. The delivery apparatus according to claim 1, further comprising a storage container positioned within the vacuum chamber, wherein the delivery apparatus is configured to deliver the volume of compound to the storage container after deaeration.

7. The delivery apparatus according to claim 1, wherein the deaerator head and the plurality of apertures are configured to be disposable.

8. The delivery apparatus according to claim 1, wherein the delivery apparatus is configured to be portable.

9. The delivery apparatus according to claim 1, wherein the delivery apparatus is configured to deaerate and deliver potting compound to a void in a honeycomb panel after deaeration, for repair of the void.

10. A method of de-aerating a volume of compound, the method comprising:
reducing an air pressure within a vacuum chamber to a reduced air pressure, wherein a deaerator head and a plurality of apertures are positioned within the vacuum chamber, wherein the deaerator head comprises a deaerator inlet and a deaerator outlet, wherein the deaerator inlet is configured for receiving the volume of compound, wherein the deaerator outlet is opposite the deaerator inlet, wherein the deaerator outlet is larger than the deaerator inlet, and wherein the plurality of apertures is positioned between the deaerator inlet and the deaerator outlet;
flowing the volume of compound through the deaerator head and the plurality of apertures while the deaerator head and the plurality of apertures are maintained at the reduced air pressure within the vacuum chamber, thereby deaerating the volume of compound, such that respective portions of the volume of compound received into the deaerator head through the deaerator inlet pass through respective apertures of the plurality of apertures before exiting the deaerator head through the deaerator outlet, and wherein the plurality of apertures are sized to increase a ratio of surface area to volume of the volume of compound as the volume of compound passes through the plurality of apertures; and
delivering deaerated compound to a void in a honeycomb panel, wherein the vacuum chamber is positioned on the honeycomb panel, and wherein the volume of compound comprises a volume of potting compound.

11. The method according to claim 10, wherein the flowing the volume of compound through the deaerator head and the plurality of apertures comprises forcing the volume of compound from a reservoir containing the volume of compound prior to deaeration towards the deaerator inlet of the deaerator head.

12. The method according to claim 10, further comprising collecting deaerated compound from the delivery apparatus in a storage container positioned in the vacuum chamber.

13. The method according to claim 10, further comprising selecting a respective deaerator head from a plurality of deaerator heads, based on a viscosity of the volume of compound.

14. The method according to claim 10, further comprising:
positioning the deaerator head and the plurality of apertures inside the vacuum chamber by moving the deaerator head and the plurality of apertures through a chamber inlet of the vacuum chamber; and
forming an inlet seal between the chamber inlet of the vacuum chamber and a reservoir containing the volume of compound prior to deaeration.

15. The method according to claim 10, further comprising disposing of the deaerator head and the plurality of apertures after performing the flowing the volume of compound through the plurality of apertures to deaerate the volume of compound.

16. A method of repairing a void in a honeycomb panel, the method comprising:
deaerating a volume of compound, wherein the deaerating the volume of compound comprises:
reducing an air pressure within a vacuum chamber to a reduced air pressure, wherein a deaerator head and a plurality of apertures are positioned within the vacuum chamber, wherein the deaerator head comprises a deaerator inlet and a deaerator outlet, wherein the deaerator inlet is configured for receiving the volume of compound, wherein the deaerator outlet is opposite the deaerator inlet, wherein the deaerator outlet is larger than the deaerator inlet, and wherein the plurality of apertures is positioned between the deaerator inlet and the deaerator outlet; and
flowing the volume of compound through the deaerator head and the plurality of apertures while the deaerator head and the plurality of apertures are maintained at the reduced air pressure within the vacuum chamber, thereby deaerating the volume of compound, such that respective portions of the volume of compound received into the deaerator head through the deaerator inlet pass through respective apertures of the plurality of apertures before exiting the deaerator head through the deaerator outlet, and wherein the plurality of apertures are sized to increase a ratio of surface area to volume of the volume of compound as the volume of compound passes through the plurality of apertures; and
delivering the volume of compound to the void after the deaerating the volume of compound, wherein the delivering the volume of compound to the void is performed inside the vacuum chamber while the reduced air pressure is maintained within the vacuum chamber, without removing the volume of compound from the vacuum chamber between the deaerating the volume of compound and the delivering the volume of compound.

17. The method according to claim 16, further comprising:
positioning the vacuum chamber with respect to the void such that a chamber outlet of the vacuum chamber circumscribes the void;
forming an outlet seal between the chamber outlet and the honeycomb panel; and
positioning the deaerator head with respect to the void such that deaerated compound exiting the deaerator outlet flows into the void.

18. The method according to claim 17, further comprising:
forming an inlet seal between a chamber inlet and a reservoir containing the volume of compound prior to deaeration, wherein the chamber inlet is opposite the chamber outlet;
coupling a reservoir outlet of the reservoir to the deaerator inlet of the deaerator head; and flowing the volume of compound from the reservoir to the deaerator head via the reservoir outlet and the deaerator inlet.

* * * * *

UNITED STATES PATENT AND TRADEMARK OFFICE
CERTIFICATE OF CORRECTION

PATENT NO. : 10,512,857 B2
APPLICATION NO. : 15/356980
DATED : December 24, 2019
INVENTOR(S) : Michael John Fleming Page 1 of 1

It is certified that error appears in the above-identified patent and that said Letters Patent is hereby corrected as shown below:

In the Claims

Claim 5, Column 41, Line 1, insert --wherein the vacuum chamber comprises an inlet seal configured to create an at-- after "claim 1," and before "least substantially"

Signed and Sealed this
Fifth Day of May, 2020

Andrei Iancu
*Director of the United States Patent and Trademark Office*